United States Patent [19]

Takahashi et al.

[11] Patent Number: 4,841,499
[45] Date of Patent: Jun. 20, 1989

[54] MULTI-DISC PLAYER

[75] Inventors: Akira Takahashi; Testuro Kamimura; Masahiko Kawamura; Kiyoshi Morikawa; Sei Onishi, all of Saitama, Japan

[73] Assignee: Pioneer Electronic Corporation, Tokyo, Japan

[21] Appl. No.: 160,049

[22] Filed: Feb. 24, 1988

[30] Foreign Application Priority Data

Feb. 24, 1987 [JP] Japan .................................. 62-39295
Feb. 24, 1987 [JP] Japan .................................. 62-39299

[51] Int. Cl.$^4$ ........................ G11B 17/28; G11B 5/48; G11B 25/04
[52] U.S. Cl. ........................................ 369/38; 369/36; 369/263
[58] Field of Search .................... 369/34, 36, 38, 75.2, 369/77.2, 263, 247

[56] References Cited

U.S. PATENT DOCUMENTS

| | | | |
|---|---|---|---|
| 4,271,489 | 6/1981 | Siryj et al. | 369/38 |
| 4,616,357 | 10/1986 | Nakayama | 369/36 |
| 4,653,037 | 3/1987 | Nakayama et al. | 369/34 |
| 4,701,900 | 10/1987 | Hasegawa et al. | 369/38 |
| 4,730,291 | 3/1988 | Ikedo et al. | 369/36 |
| 4,731,777 | 3/1988 | Yoshitoshi et al. | 369/263 |

*Primary Examiner*—Steven L. Stephan
*Attorney, Agent, or Firm*—Sughrue, Mion, Zinn, Macpeak, and Seas

[57] ABSTRACT

A carriage supporting apparatus in a disc player is disclosed which comprises a carriage plate; a holder for supporting the carriage plate; a first damper portion provided at one of the carriage plate and the holder, the first damper portion having an annular surface and a plurality of pleat-like projections formed on the annular surface; a second damper portion provided at remaining one of the holder and the carriage and having an annular portion which confronts, with a space, the pleat-like projections of the first damper portion; and a cup-shaped thin wall portion disposed between the first and second damper portions.

11 Claims, 25 Drawing Sheets

MULTI-DISC PLAYER

BACKGROUND OF THE INVENTION

The present invention relates to an improved multi-disc player. More specifically, the present invention relates to a disc selection device for selecting one of multiple discs and taking out the selected disc in a multi-disc player. In the multi-disc player, provided is a magazine accommodating therein a plurality of discs, and one of the discs is brought to a reproducing position. Also, the present invention relates to a device for acknowledging disc existence which detects a position of a selected one of the discs in a magazine and detects transfer thereof.

The present invention relates to a pick-up driving device for moving a pick-up member which reads out signals in a tracking direction of a disc in order to detect signals recorded on the disc in a disc player.

The present invention also relates to a carriage supporting apparatus which supports a carriage plate with reduced vibration. The carriage plate mounts thereon a spindle motor for driving a disc, a pick-up for reading out signals, etc., in a disc player.

The present invention also relates to a disc clamp apparatus in which an improvement is made on a spindle member including a spindle motor etc. for driving a disc and a clamper for clamping the disc in association with the spindle member in a disc player which reproduces recording disc such as a video disc and a compact disc.

In a conventional disc selection device of a multi-disc player of this type, a holder into which a magazine is inserted is movable in a thickness direction of the disc to a position where one of the desired discs is transferred to a player.

However, if the holder is inclined during travel of the holder, a disc transferring means of the player may be transferred, or the transferring means may abut the magazine, so that it becomes impossible to transfer the disc.

Also, according to a conventional multi-disc player, there is no detection means which detects disc transfer to the player.

Due to the lack of the detection means, there is probability that the disc is not accommodated in a position of the magazine when the disc for reproduction is selected and the disc is intended to be transferred to the player by a remote control to the multi-disc player.

Since visual observation to the inside portion cannot be made, the operator cannot acknowledge the non-existence of the disc, and the operator is irritated by a long wait for reproduction or playback start.

Further, even if the disc is jammed and is not completely transferred to the player, the player initiates its reproducing operation, so that the mechanism may be damaged.

SUMMARY OF THE INVENTION

It is an object of the present invention to overcome drawbacks in the conventional multi-disc player, and to provide an improved device in which a magazine loaded holder is displaced in a thickness direction of the disc without any inclination thereof for disc selection and for avoiding transfer of two discs or any trouble in disc transfer due to inclination of the holder.

It is another object of the invention to provide an improved disc existence acknowledgment device in a multi-disc player of the type wherein a reproducing mechanism is operated by a remote controlling unit. The acknowledgment device is capable of detecting transfer of the disc from a magazine to a player. If the disc is not transferred, such fact is acknowledged by an operator for again performing the remote control manipulation, or for supplementing a disc into the magazine. The acknowledgment device is also capable of preventing the player from starting reproduction in case of no disc transfer, or capable of eliminating breakdown of the player by returning the transfer means. If the magazine is not completely filled with discs, the acknowledgment device prevents the disc from transferring to the reproduction position. Therefore disc existence is promptly detected for performing subsequent disc reproduction by the acknowledgment device.

To attain these and other objects, in the present invention, a slide plate is disposed at each left and right side of a holder, and each of the slide plates is formed with a cam surface for moving the holder in a vertical direction, the cam surface of the left slide plate being symmetrical with the cam surface of the right slide plate. Each of the slide plates is also formed with a rack with which gear wheel is meshingly engaged. Left and right gear wheels are coupled together by a shaft. By the rotations of the gear wheels, the slide plates are displaced by distances equal to each other, so that vertical movement of the holder along the cam surfaces is synchronously provided.

As described above, in the present invention, each of the right and left slide plates formed with the cam surface for vertically moving the magazine holder is formed with the rack, and each of the racks is engaged with each of the left and right gears coupled together by the single shaft. Therefore, the slide plates are synchronously moved by the concurrent rotations of the gears.

Accordingly, the magazine holder is elevated while maintaining its horizontal orientation along the cam surfaces of the left and right slide plates, and the magazine accommodated in the magazine holder is also elevated maintaining its horizontal orientation.

As a result, obviated are disc damage and inoperability due to the abutment of the disc pushed out from the magazine against the segment of the player, such abutment being caused by the inclination of the magazine.

Further, by providing a detection means which detects the position of the magazine holder, discharge of two disc can be further avoided, so that there are solved various problems attendant to the disc transfer from the magazine of the multi-disc player into the player by means of the disc transferring mechanism.

In the present invention a detection means is provided in a guide member which restricts disc movement in thickness direction thereof. The detection means optically detects passing of the disc through a disc transferring path which is given by a disc transfer means movable between a magazine and a player.

When the disc is transferred from the magazine to the player, the disc travel is optically detected by the optical detection means. If the disc is not transferred, this fact is acknowledged by an operator, and subsequent operations are suspended, or the disc mount plate can be returned into the magazine.

Generally, in the multi-disc player, disc transfer from the magazine to the player is performed in a blind space which is invisible for the operator. However, because of the acknowledgment, the operator can acknowledge the non-existence of the disc at the player reproduction position, and long time waiting can be avoided for reproduction start due to non-acknowledgment of the non-transfer of the disc to the player in spite of the disc transfer and reproduction command.

Further, even if the disc is not transferred due to abutment of the disc on the neighbouring segment, during disc travel, subsequent operation is suspended to thereby avoid any breakdown, or the latched disc can be returned into the magazine for performing the subsequent operation. Therefore, any mechanical breakdown can be avoided.

Further, constant distance between the disc and the detection means is maintained by the provision of the optical detection means in the guide member which restricts movement of the disc in a thickness direction thereof. Therefore, stabilized detection results.

BRIEF DESCRIPTION OF THE DRAWINGS

FIGS. 1 through 26 show one embodiment of the present invention, and in which;

FIGS. 1 and 2 are perspective exploded segmental view;

FIG. 3 is a perspective view showing an overall arrangement installed on a vehicle;

FIG. 4 is a plan view;

FIG. 5 is a plan view in which most of the upper plate is cut away;

FIG. 6 is a plan view showing a magazine holder and a carriage plate;

FIG. 7 is a plan view showing a clamper push-down mechanism and a carriage plate holder locking mechanism;

FIG. 8 is a plan view showing pushing out state of a disc pushing arm shown in FIG. 7 upon rotation;

FIG. 9 is a plan view showing locking state of the carriage plate holder shown in FIG. 7;

FIG. 10 is a plan view showing the relationship between a magazine and a spindle table;

FIG. 11 is a plan view showing play position of a disc mount plate shown in FIG. 10 upon rotation;

FIG. 12 is a plan view of the carriage plate holder;

FIG. 13 is a side view in which one frame side is cut away;

FIG. 14 is a side view showing an essential portion when the magazine holder is moved to a lowermost position;

FIG. 15 is a side view showing a position of the magazine holder and a disc setting position relative to the spindle table;

FIG. 16 is a side view of the carriage plate holder;

FIG. 17 is a side view showing a disc guide plate and a photo sensor;

FIG. 18 is a perspective view showing a mean for fixing a spindle table;

FIG. 19 is a front view showing a supporting state of a pick-up member;

FIG. 20 is a plan view of a feed screw portion;

FIG. 21 is a cross-sectional view showing a carriage plate supporting unit;

FIG. 22 is an enlarged cross-sectional view showing the damper in the supporting unit;

FIGS. 23 and 24 are cross-sectional views showing dampers according to other embodiments;

FIGS. 25 and 26 are graphs showing relationship between a damper stroke and attenuation force in the dampers shown in FIGS. 22 and 23;

DESCRIPTION OF THE PREFERRED EMBODIMENTS

An embodiment of the present invention will be described with reference to accompanying drawings to which a multi-disc player pertains.

Figure 3:
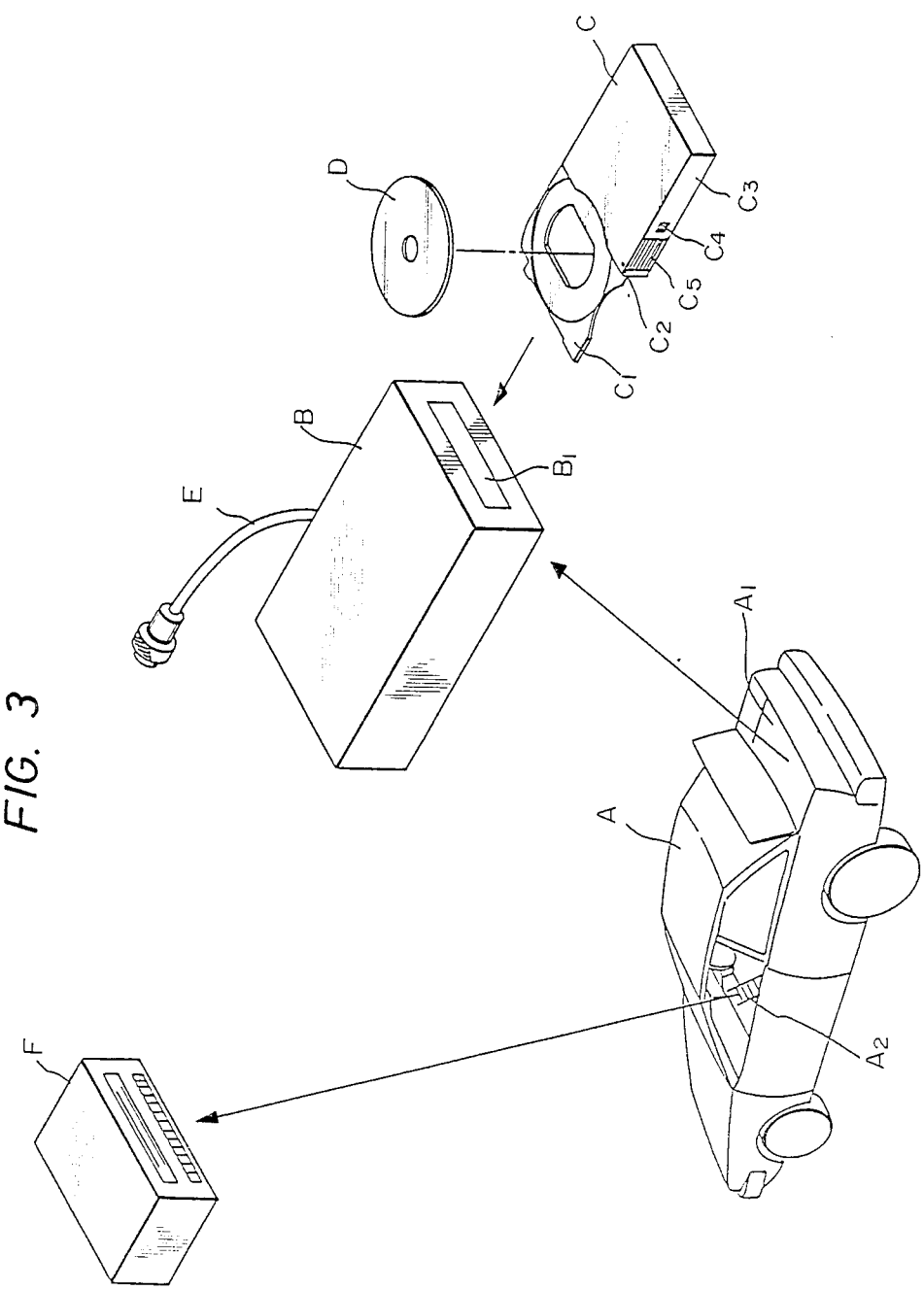
Figure 4:
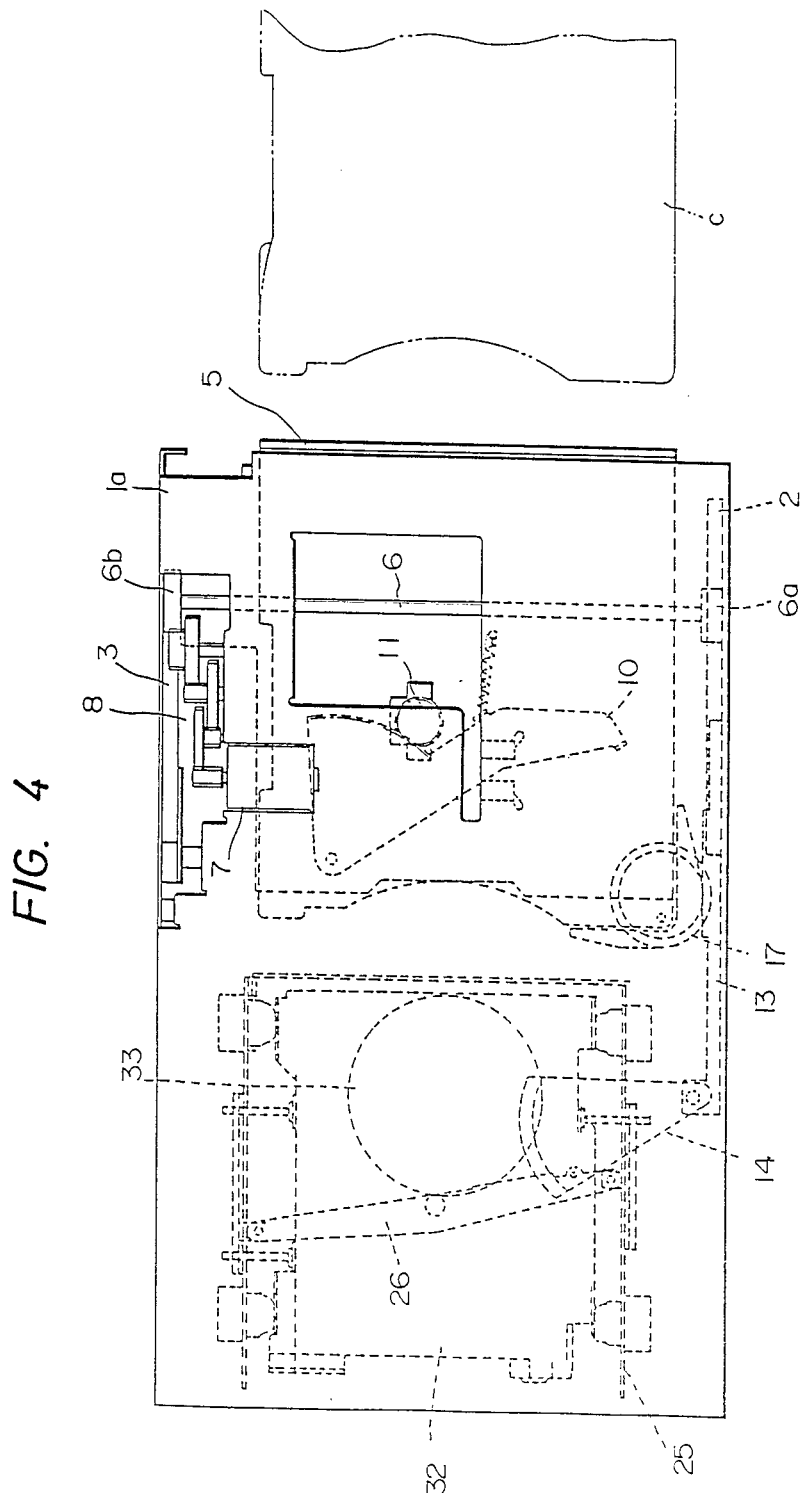

This multi-disc player is particularly available for installation on a four wheeled vehicle as shown in FIG. 3 A main player body B is installed in a trunk $A_1$ of the vehicle A, and a magazine C is insertable into the main player body B.

In the magazine $C_1$, a plurality of disc mount plates $C_1$ are rotatably provided at a shaft $C_2$, and each one of severs discs D is mounted on respective disc mount plates $C_1$. One selected disc mount plate $C_1$ is rotated about the shaft $C_2$, so that a desired disc D can be set in the main player body B.

The main player body B is connected, through a cable E, to a remote control unit F mounted on a dashboard $A_2$ of the vehicle.

By the operation of the remote control unit F, one of the desired discs is selected among the plurality of discs D in the magazine C, and the disc D is transferred from the magazine C to the main player body B for audible sound reproduction.

In a case $C_3$ of the magazine C, slots $C_5$ are formed at one side thereof and adjacent the shaft $C_2$. One of the disc count plates $C_1$ mounting thereon the desired disc D is pushed through the slot $C_5$, and is rotated, so that the plate $C_1$ is pushedly moved out of the case $C_3$.

Further, a recess $C_4$ is formed in the case $C_3$ for latching the same.

Next, a structure of a main player body B will be described.

Reference numeral 1 designates a frame on which an upper plate 1a is mounted to provide a box shape. The frame has left and right side walls from which shafts 1b extend internally and on which a guide slot 1c is formed. Slide plates 2 and 3 are slidably disposed in frontward and rearward directions relative to the left and right side walls of the frame 1. The slide plates 2 and 3 are formed into horizontally extending guide slots 2a with which the shafts 1b are inserted.

One slide plate 2 is formed with two step-like cam slots 2b. The remaining plate 3 is formed with a single step-like cam slot 2b, and with a mark plate 4 in which are formed holes 4 arranged in-line in horizontal direction and having a number equal to the number of the disc mount plates 4 of the magazine C.

Reference numeral 5 designates a magazine holder having a box-like shape, which shape is provided by fixing an upper plate 5a to left and right side plates 5c and 5d mounted on a lower plate 5b. Two pins 5e and a single pin 5e are implanted on the upper plate 5a in a transverse direction and at positions corresponding to side plate 5c and side plate 5d, respectively.

These pins 5e extend through the cam slots 2b of the slide plates 2 and 3 and into the guide slots 1c of the frame 1. Therefore, the magazine holder 5 is not movable in the longitudinal direction, and is kept in a horizontal plane by a three point support.

Racks 2c are engravingly formed on upper faces of the slide plates 2 and 3. The racks 26 are meshingly engaged with gear wheels 6a and 6b which are connected together by a single shaft 6.

A motor 7 is provided on the upper plate 1a. Rotation of the motor 7 is speed reduced and transmitted to the gear wheel 6b through a plurality of reduction gear mechanisms 8. Upon rotation of the gear wheels 6a, 6b, the racks 2c engaged therewith are moved in the longitudinal direction, so that the slide plates 2 and 3 are slidingly moved in the longitudinal direction, while they are guided by the shaft 1b engaged with the guide slots 2a.

Photo sensors $P_1$ are provided on the upper plate 1a with interposing the mark plate 4 between the sensors.

The magazine C is insertable into a space defined by the upper plate 5a, lower plate 5b and side plates 5c and 5d of the magazine holder 5. An arm 9 is pivotally supported to the upper plate 5a, and a spring 9a urges the arm 9 counterclockwise.

When the magazine C is inserted into the magazine holder 5, a tip end of the magazine C abuts the bent portion 9b of the arm 9 to pivot the latter.

A switch SW is provided on the upper plate 5a. The switch SW is operated by the arm 9 when the latter is rotated.

A swing arm 10 is pivotally supported on the lower plate 5b and has a bent piece 10a. The bent piece 10a extends through an elongated slot 5f formed in the lower plate 5b and into the interior of the magazine holder 5. When the magazine C is inserted into the magazine holder 5, the magazine C urges the bent piece 10a to pivotally move the swing arm 10.

A spring 10b is connected to the swing arm 10 to bias the latter towards a direction opposite the inserting direction of the magazine. Gear teeth 10c are formed on the swing arm 10 and is meshingly engage with a gear speed governor 11. When the magazine C is urged toward outside of the magazine holder 5 by the biasing force of the spring 10b, the rear resistor 11 can reduce rotation speed of the swing arm 10, so that the eject speed of the magazine C can be moderated.

A locking arm 12 is pivotally secured to the side plate 5c and is connected with a spring 12a, so that a locking end 12b is extendable into the internal space of the magazine holder 5.

Figure 5:
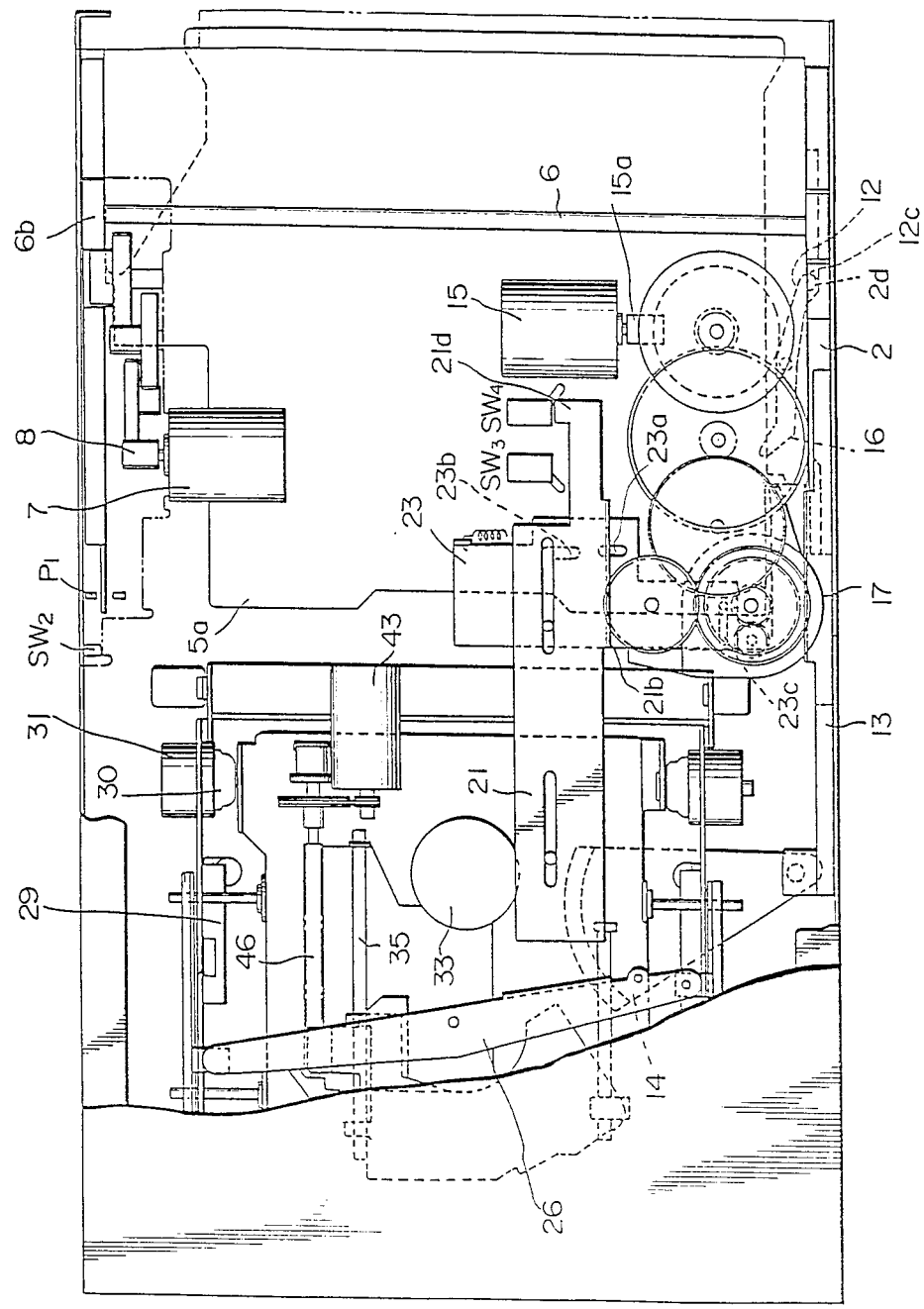

Another end 12c of the locking arm 12 is in contact with a recess 2d of the slide plate 2 as shown in FIG. 5. However, when the slide plate 2 is slidingly moved as described above, a portion other than the another end 12c is brought into contact with the recess 2d, so that the locking end 12b of the locking arm 12 is retracted from the internal space of the magazine holder 5.

A second slide plate 13 is slidably disposed along the side wall of the frame 1. The second slide plate 13 is formed with guide slots 13a extending in the horizontal direction, which are engaged with a shaft extending from the one side wall of the frame 1, so that the second slide plate 13 is guided.

A rack 13b is engravingly formed at the side surface of the slide plate 13. One end of a clamper depression cam 14 pivotally supported on the lower surface of the frame 1 is secured to a coupling portion 13c. When the slide plate 13 is slidingly moved, the clamper depression cam 14 is rotated.

Figure 2:
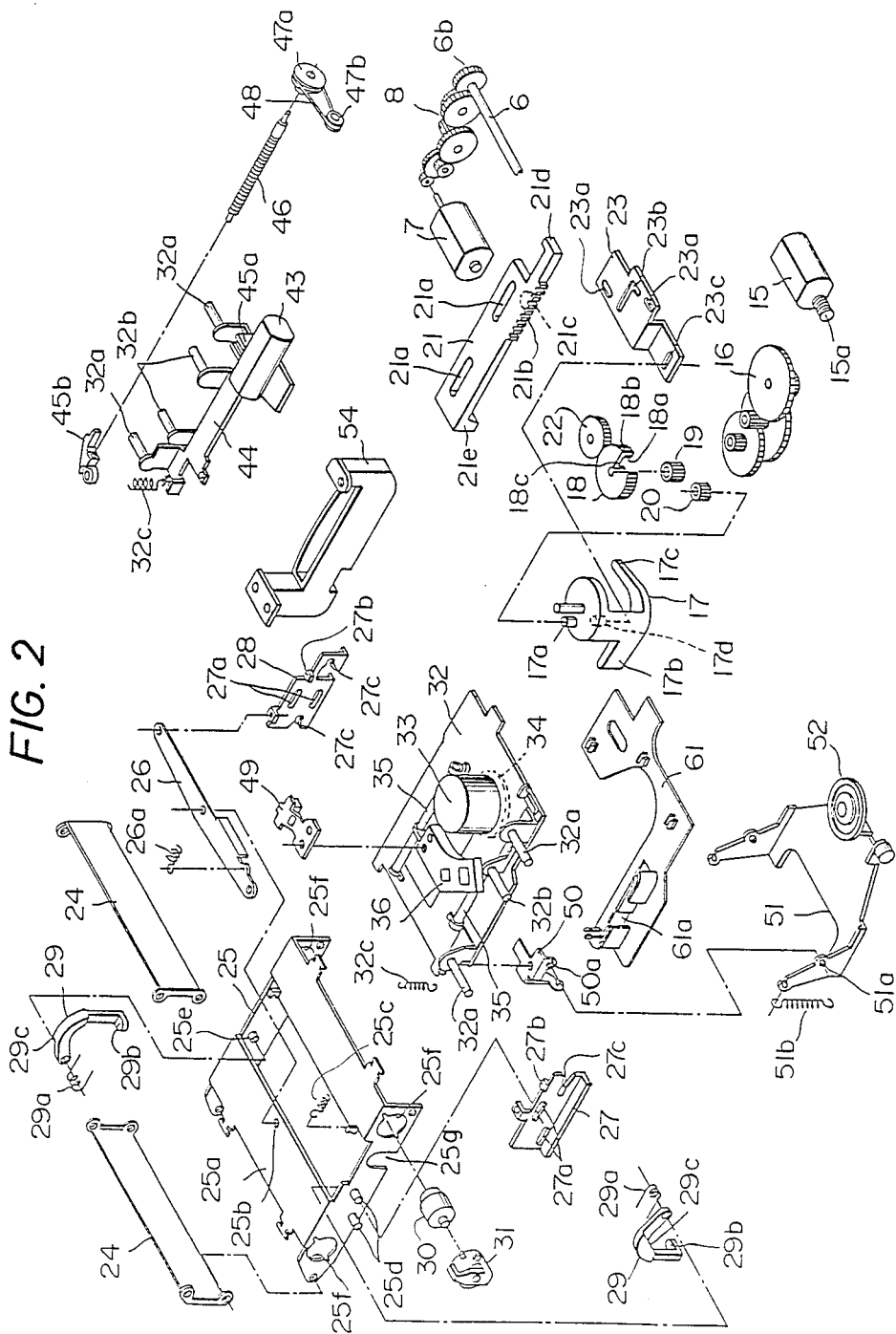

Further, a motor 15 (FIG. 2) is disposed at the lower surface of the upper plate 1a, whose motor shaft is fixed with a worm 15 engaged with a reduction gear mechanism 16 having a plurality of reduction stages.

A push arm 17 is rotatably provided on a shaft of the upper plate 1a so as to rotate the disc mount plate $C_1$ of the magazine C. A shaft portion 18c of a dual sides gear 18 is rotatably supported coaxially with the rotation axis of the push arm 17. The dual sides gear 18 has a cylindrical member whose inner and outer peripheral surfaces are formed with internal gear 18a and external gear 18b, respectively.

A small gear 19 is rotatably fitted with the shaft portion 18c, and is meshingly engaged with the internal gear 18a. Further, the shaft portion 17a of the push arm 17 is rotatably provided with a planetary gear 20 which is orbitally moved around the small gear 19 in accordance with the rotation of the push arm 17.

The small gear 19 is meshed with the reduction gear mechanism 16, so that the rotation of the motor 15 is transmitted to the small gear 19. However, when the rotation of the external gear 18b is restrained, the planetary gear 20 is orbitally moved around the small gear 19, and when the rotation of the push arm 17 is restrained, the dual sides gear 18 is rotated.

The external gear 18b is in meshing engagement with an intermediate gear 22 which is meshingly engaged with a rack 21b of a third slide plate 21. The slide plate 21 is formed with an elongated slot 21a into which a shaft of the upper plate 1a is inserted.

Further, a regulating plate 23 is formed with an elongated guide slot 23a into which a shaft extending from the upper plate 1a is inserted, so that the regulating plate 23 is slidable laterally. The plate 23 is also formed with an L shaped guide slot 23b into which a projection pin 21c of the slide plate 21 is slidably inserted.

Furthermore, the push arm 17 is provided with a pivot arm 17c for pushing out the disc mount plate $C_1$ from the case $C_3$, a push recovery arm 17b for pushing the disc mount plate $C_1$ into the case $C_3$, and a protruding pin 17d directed in parallel with a pivot center of the push recovery arm 17c. The protruding pin 17d is inserted into a guide slot 23c extending in a direction perpendicular to the guide slot 23a of the regulating plate 23.

At first, the projection pin 21c of the third slide plate 21 is positioned at an extreme end of the guide slot 23b, the extreme end being directed in parallel with the guide slot 23a, so that sliding movement of the slide plate 21 is restrained. For this, rotation of the external gear 18b is prevented because of the engagement with the rack 21b through the intermediate gear 22.

In this case, when the motor 15 is operated, the planetary gear 20 is rotatingly moved around the small gear 19 by the rotation of the small gear 19. Accordingly, the shaft 17a is rotated to rotate the push arm 17.

Then, the protruding pin 17d slidingly moves along the guide slots 23c, so that the regulating plate 23 is slid along the guide slot 23a.

When the push arm 17 is rotated by 90 degrees, the projection pin 21c is coming into a corner portion of the L-shaped guide slot 23b because of the sliding movement of the regulation plate 23, and therefore, the slide plate 21 becomes slidable.

At the same time, the protruding pin 17d reaches the end of the guide slot 23c, so that the push arm 17 is prevented from its rotation. As a result, orbitally movement of the planetary gear 20 is ceased, while the internal gear 18a is rotatable, to thereby permit the slide plate 21 to be slidable through the intermediate gear 22 and the rack 21b.

A holder 25 is provided for holding a carriage plate 32 and is suspended by a pair of suspension arms 24 and is thus movable in arcuate locus with respect to the upper plate 1a. A fixing arm 26 is rotatably supported on a lateral plate portion 25a of the holder 25 and a shaft 25b of the lateral plate portion 25a.

When the slide plate 21 is slidably moved, a tip end 21e of the slide plate 21 abuts against the fixing arm 26 and the lateral plate portion 25a to urge the same.

A tensile spring 26a is provided between the fixing arm 26 and the holder 25, and a tensile spring 25c is provided between the holder 25 and the upper plate 10.

Each left and right side surface of the holder 25 is provided with pins 25d which extend through slide slots 27a of fixing plates 27, 28. The fixing plates 27, 28 are connected to distal ends of the fixing arm 26.

Therefore, when the fixing arm 26 is pushed by the slide plate 21, the fixing plates 27, 28 are slidingly moved along the guide holes 27a.

Two single support arms 29 for supporting a disc D are rotatably supported on shafts 25e at left and right inner surfaces of the holder 25. A free end 29b of each support arm 29 is urged downwardly by the biasing force of a spring 29a provided over the shaft 25d.

Each support arm 29 is formed with a cam surface 29c with which protruded pieces 27b of the fixing plates 27, 28 are contacted. When the fixing arm 26 are rotated as described above, the protruded piece 27b pushes the cam surface 29c, so that the free end 29b is moved upwardly against the biasing force of the spring 29a.

Further, a single fixing groove 27c and double fixing grooves 27c are formed in the fixing plate 27 and the fixing plate 28, respectively. These grooves extend transversely and have V-shape.

Furthermore, fixing holes 25f are perforated at each side of the holder 25, and a support member 31 of a damper 30 is assembled to each of the fixing holes 25f.

The damper 30 is made of elastic material such as rubber for damper function. Bosses 32a extending from the carriage plate 32 in the lateral direction are inserted in central holes 30a of the dampers 30, so that external vibration is not transmitted from the holder 25 to the carriage plate 32.

A single fixing shaft 32b extends from the carriage plate 32, and two fixing shafts 32b extend from a subordinated plate 44 fixed to the carriage plate 32. Each of the fixing shafts 32b extends through an open bottom hole 25g of the holder 25 toward the outside. Upon sliding movement of the fixing plates 27 and 28, each fixing shaft 32b mates with a V-shape fixing groove 27c of the fixing plates, so that the carriage plate 32 is fixed to the holder 25.

Springs 32c are provided in order to suspend the carriage plate 32 from the holder 25. The springs 32c are adapted to balance weight between the carriage plate 32 and associated components fixed thereto, and prevent the load from exerting on the damper 30 so as to improve dampening function of the damper 30.

Figure 18:
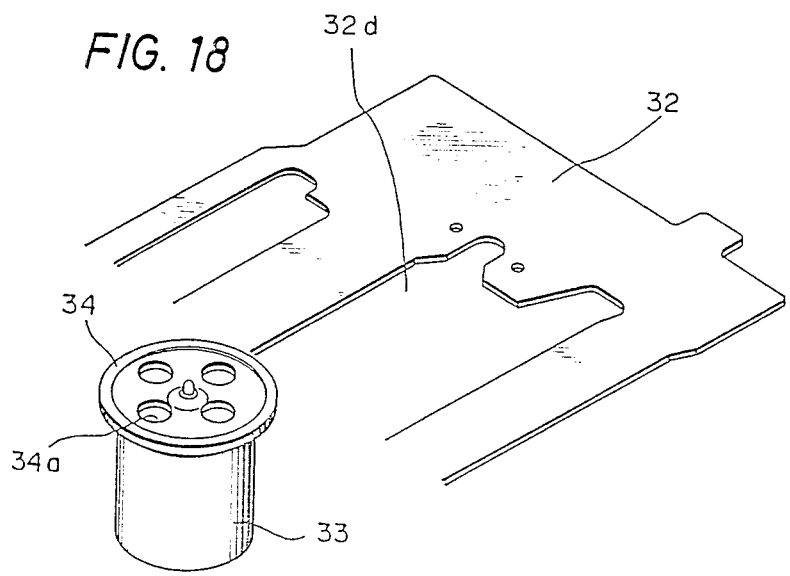

A spindle motor 33 is provided to the carriage plate 32. As shown in FIG. 18, a spindle table 34 is provisionally fixed to the spindle motor 33. The spindle motor and the spindle table are inserted laterally through an opening 32d into a fixing portion of the carriage plate 32, and screws are clamped through holes 34a of the spindle table 34 to the carriage plate 32, so that the spindle motor 33 is fixed to the carriage plate 32.

With the structure, since the spindle table 34 is provisionally fixed to the spindle motor 33, the assembling process can be simplified, and inclination of the spindle table 34 is avoidable. Further mechanical parts can be reduced for assembly.

Two guide rails 35 are fixed to the carriage plate 32 for guiding a pick-up member 36.

Figure 19:
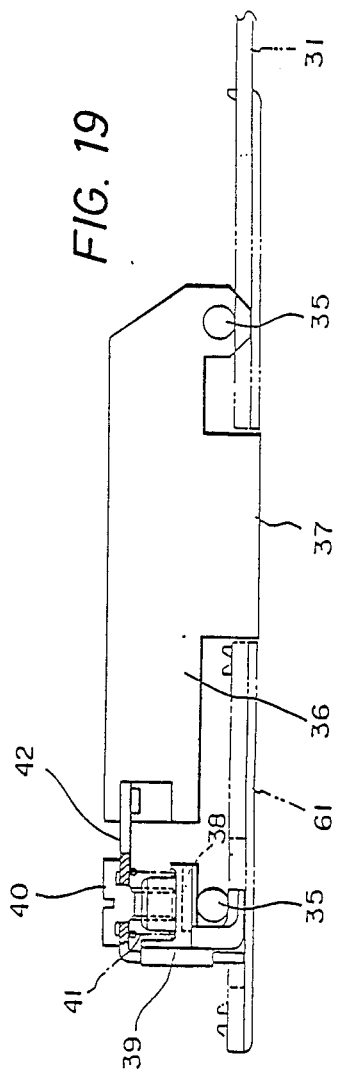

As shown in FIG. 19, the pick-up member 36 includes a main pick-up body 37 which has a slidable fitting with the one of the guide rails 35, a slide piece 39 vertically interposing the other guide rail 35 and having a magnet 38 embedded at one side thereof, a screw 40 threadingly engaged with the slide piece 39, and a linkage segment 42 through which the screw 40 is engaged and interposing a spring 41 relative to the slide piece 39.

The linkage segment 42 has one end fixed to the main pick-up body 37.

The magnet 38 provides magnetic force, so that the slide piece 39 is urged in one direction to reduce the minute gap between the slide piece 39 and the guide rail 35, and as a result, rattling of the pick-up member 36 is prevented.

By the control of clamping of the screw 40, horizontal position of the main pick-up body 37 is controlled.

Figure 20:
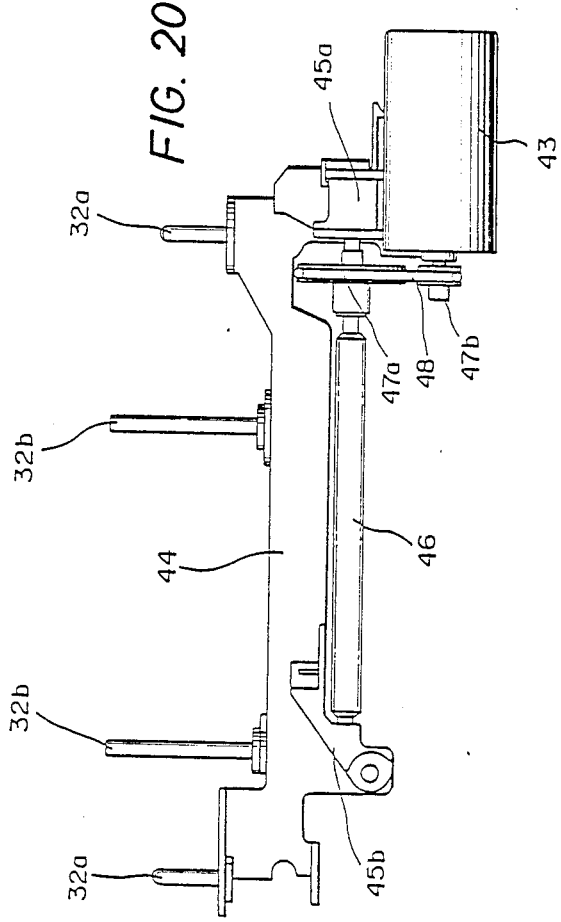

As shown, in FIG. 20, the carriage plate 32 is fixed with the subordinate plate 44 which is fixed with a motor 43 which drive the pick-up member 36 toward in a tracking direction. The other two fixing shafts 32b and the projection shaft 32a are fixed to the subordinate plate 44.

Bearing members 45a, 45b are fixed to the subordinate plate 44 for supporting a feed screw 46. The feed screw 46 has one end provided with a pulley 47a, and a motor pulley 47b is connected to the pulley 47a through a belt 48, so that rotation of the motor 43 is transmitted to the feed screw 46.

On the other hand, the pick-up member 36 is provided with a rack 49 which is in meshing engagement with the feed screw 46. As a result, the pick-up member 36 is driven in the tracking direction by the rotation of the motor 43.

In view of the above, by the employment of the subordinate plate 44, numbers of holes formed in the carriage plate 32 can be reduced, to thereby increase the strength of the carriage plate 32 to thus avoid natural bending thereof.

The carriage plate 32 is fixed with a support segment 50 whose shaft 50a pivotably supports a pivot point 51a of a clamper supporting plate 51. Further, a spring 51b is disposed between the clamper supporting plate 51 and the support segment 50 so as to urge a clamper 52 in the upward direction. The clamper 52 is secured to a tip end of the clamper supporting plate 51.

Figure 1:
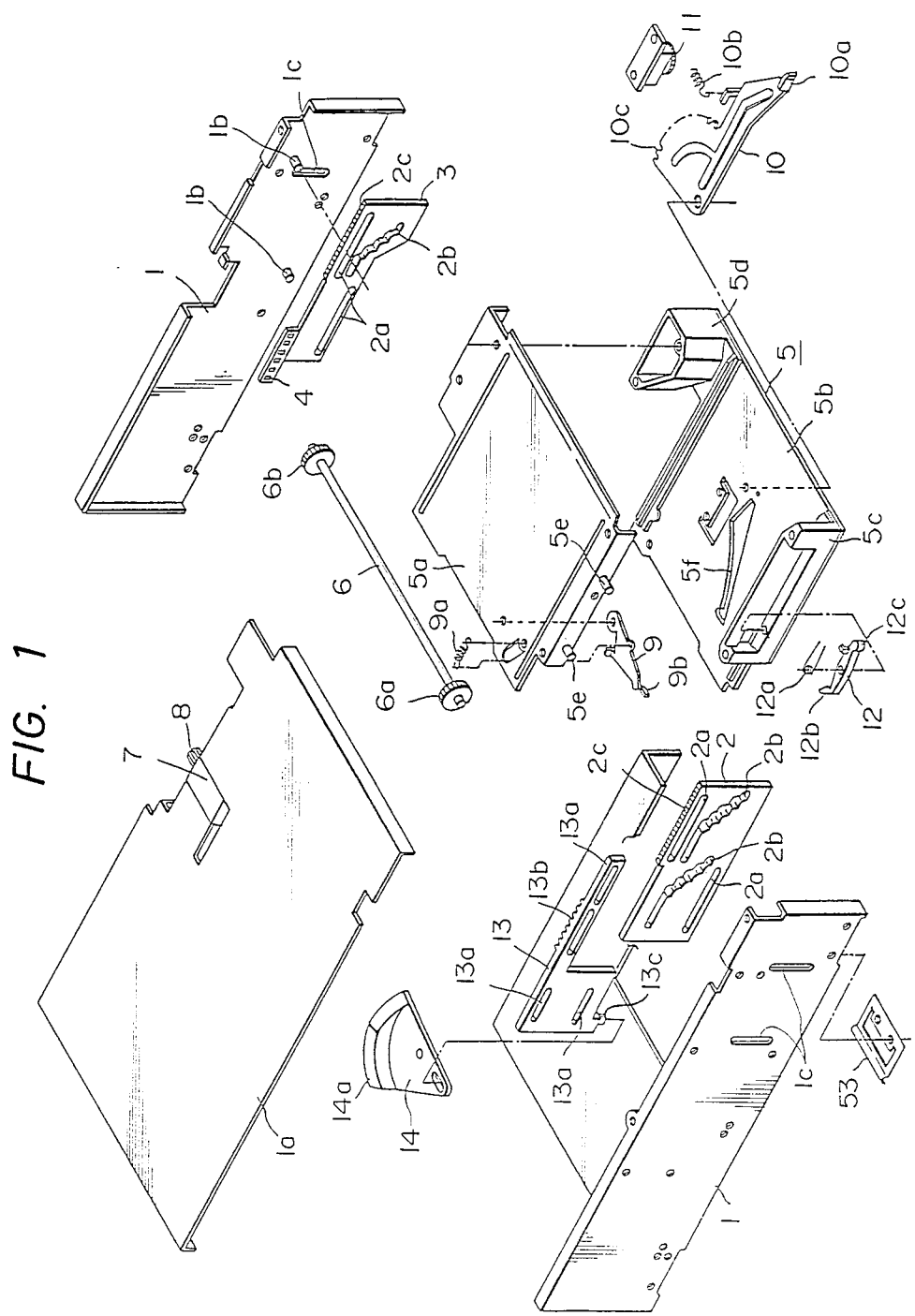
Figure 6:
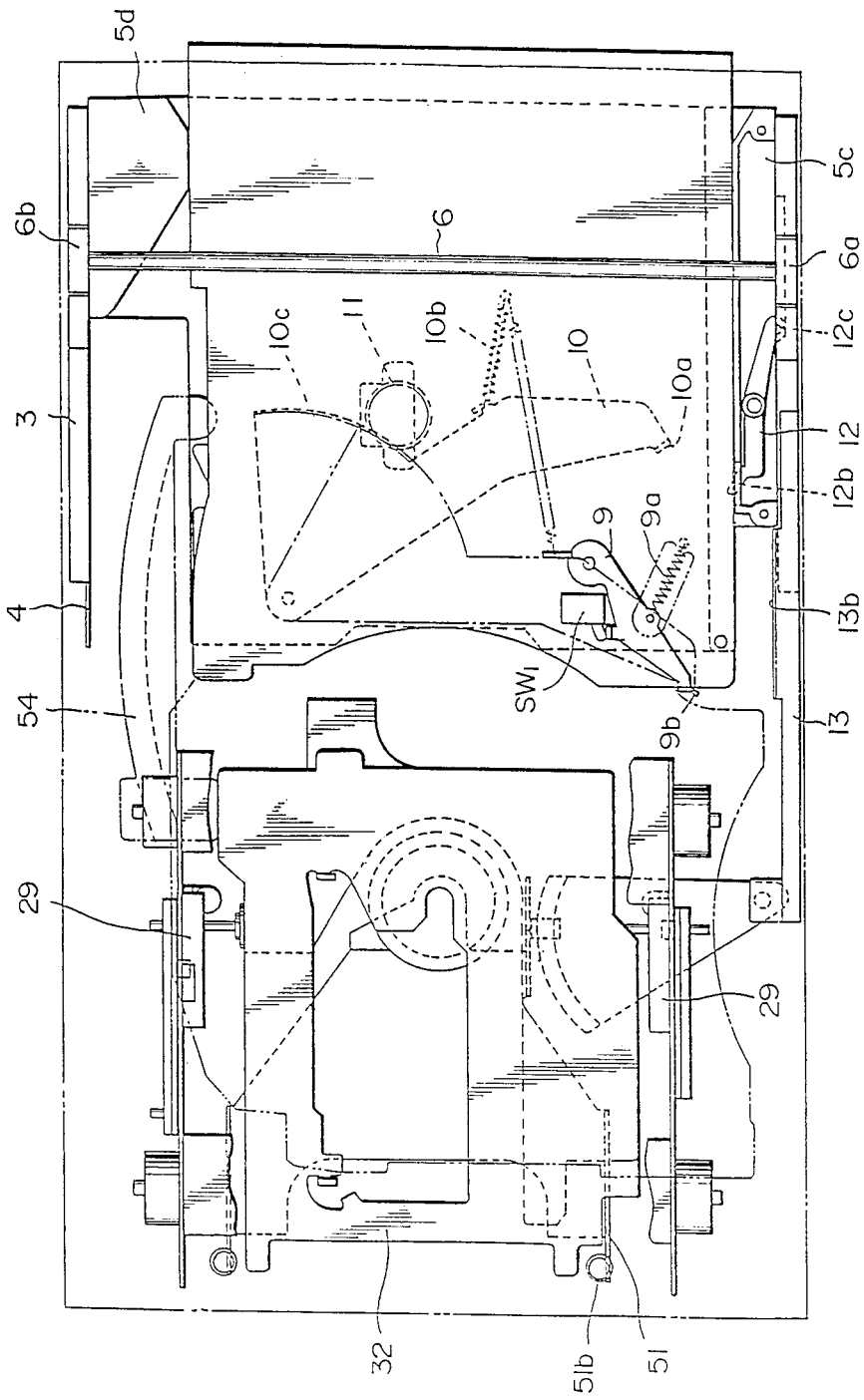
Figure 7:
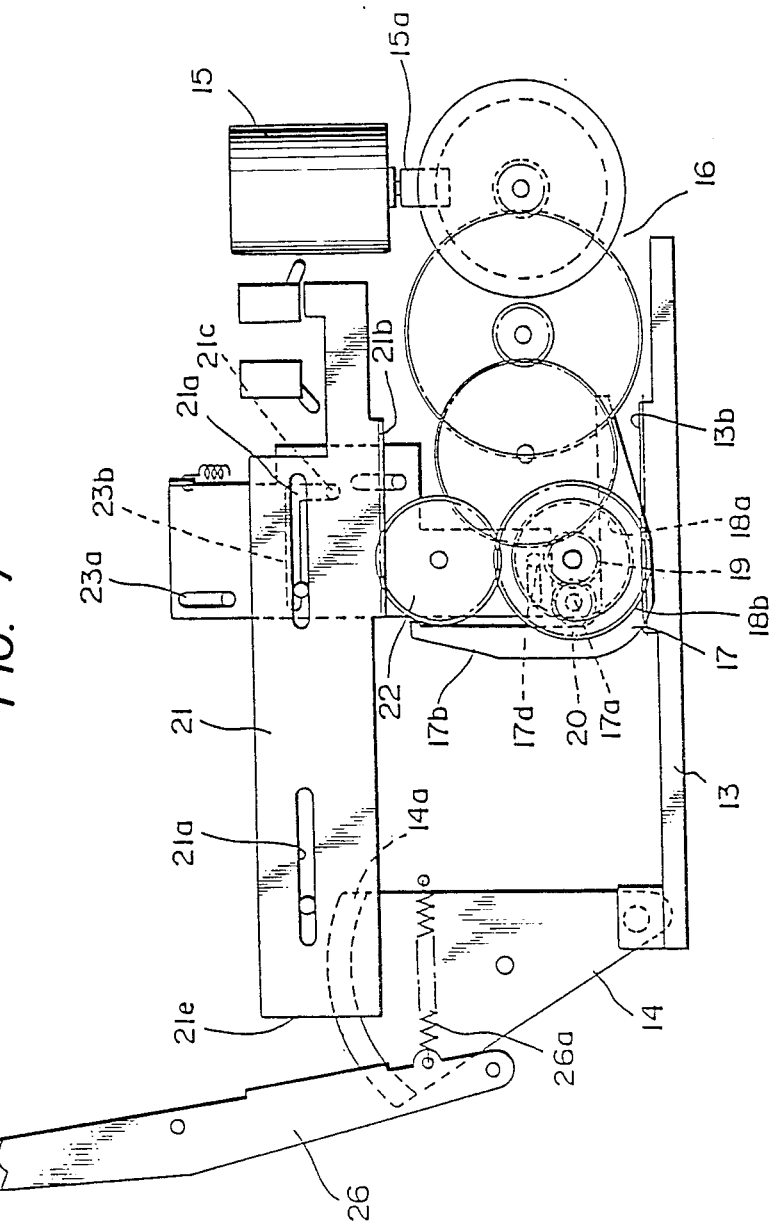
Figure 8:
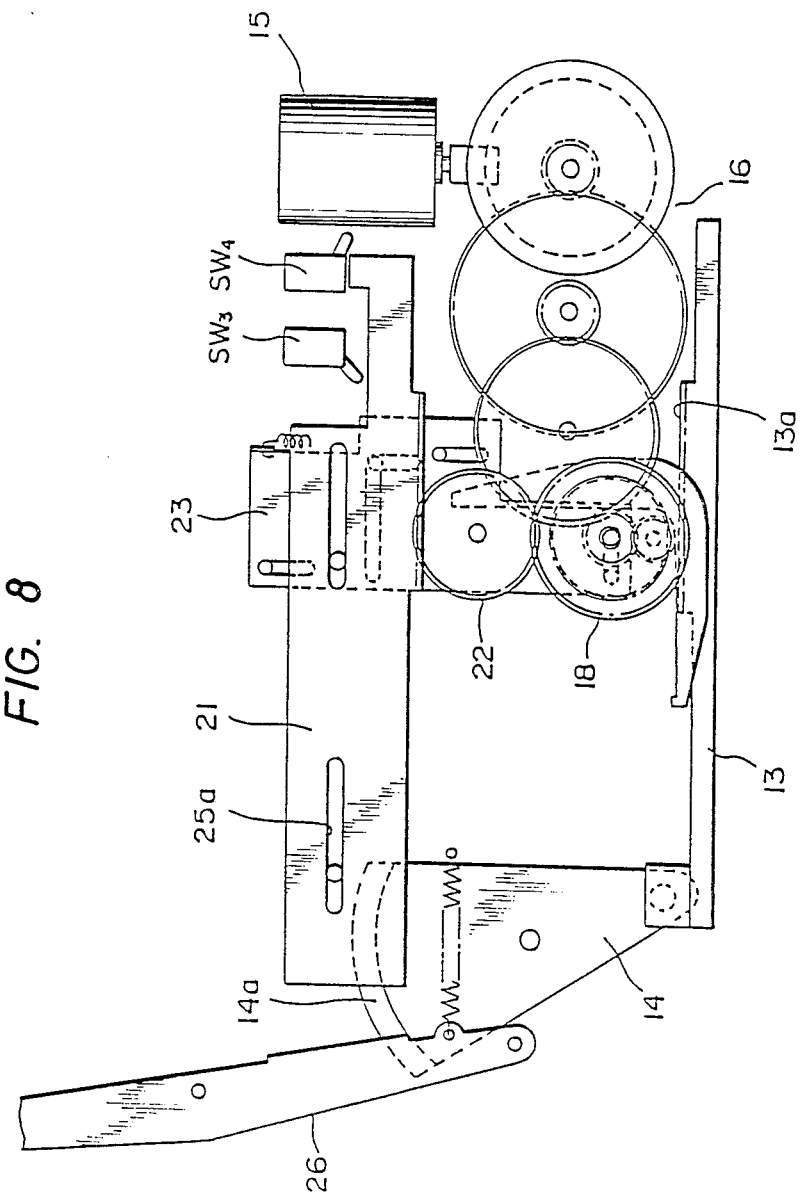
Figure 9:
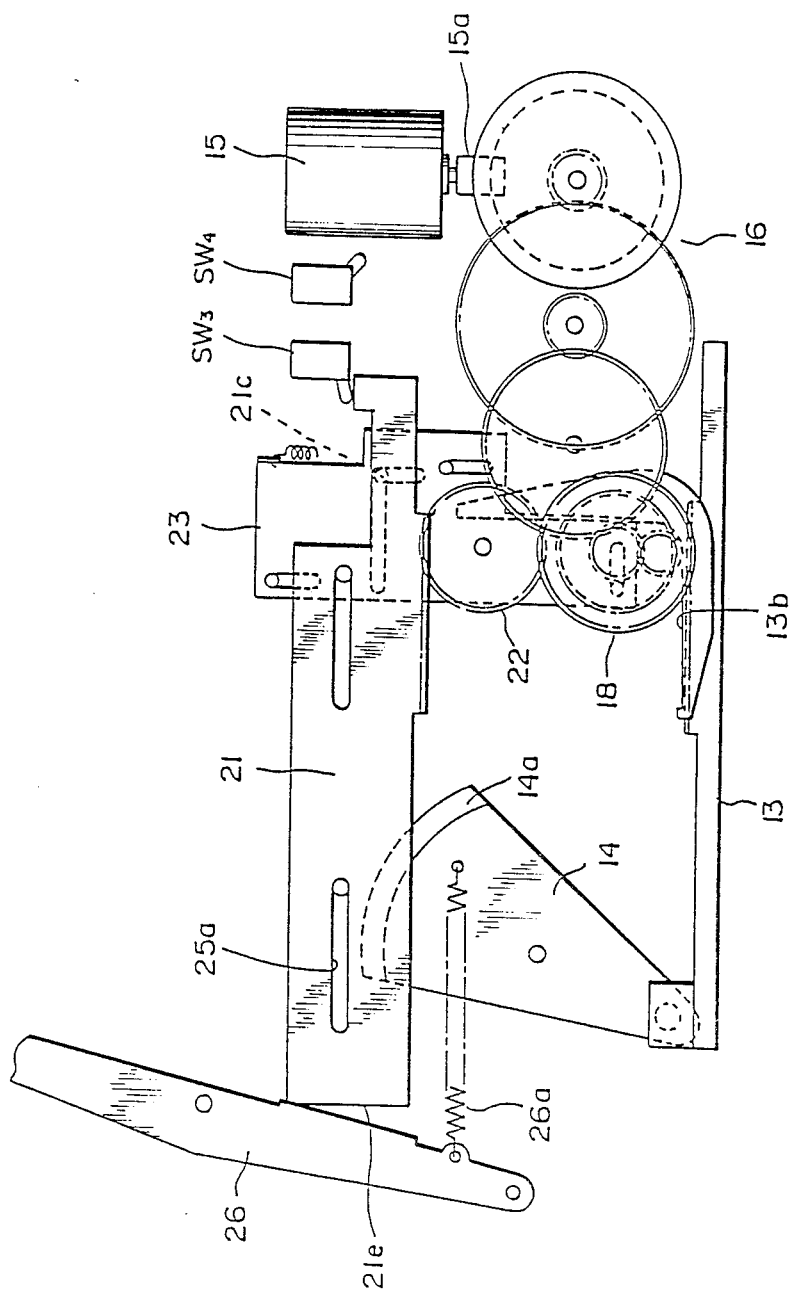
Figure 14:
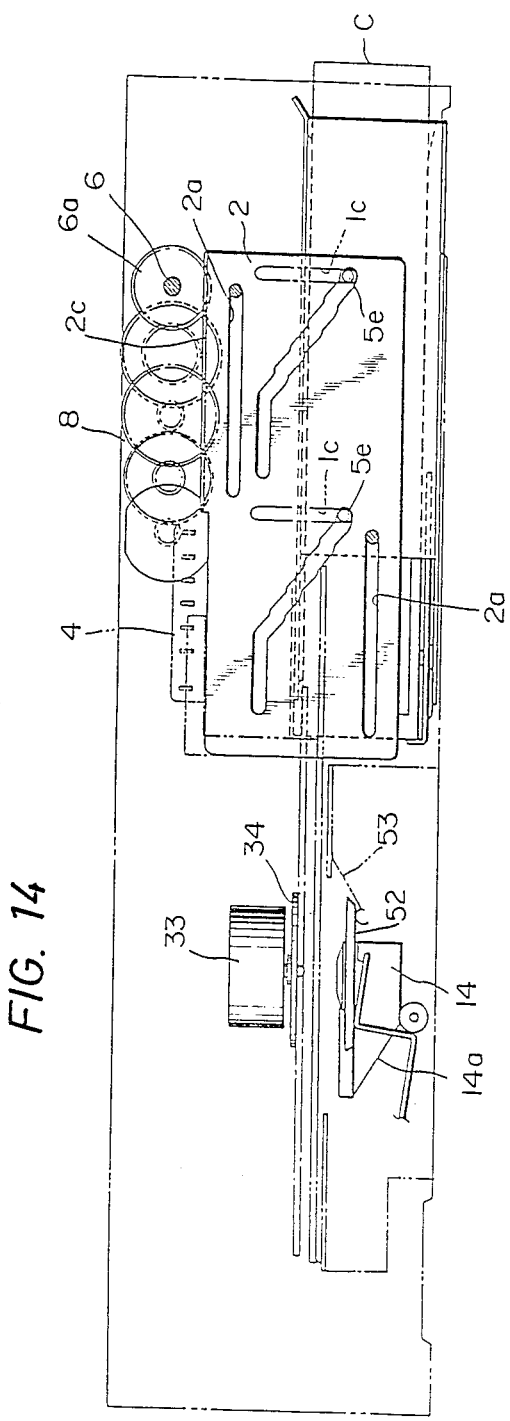
Figure 15:
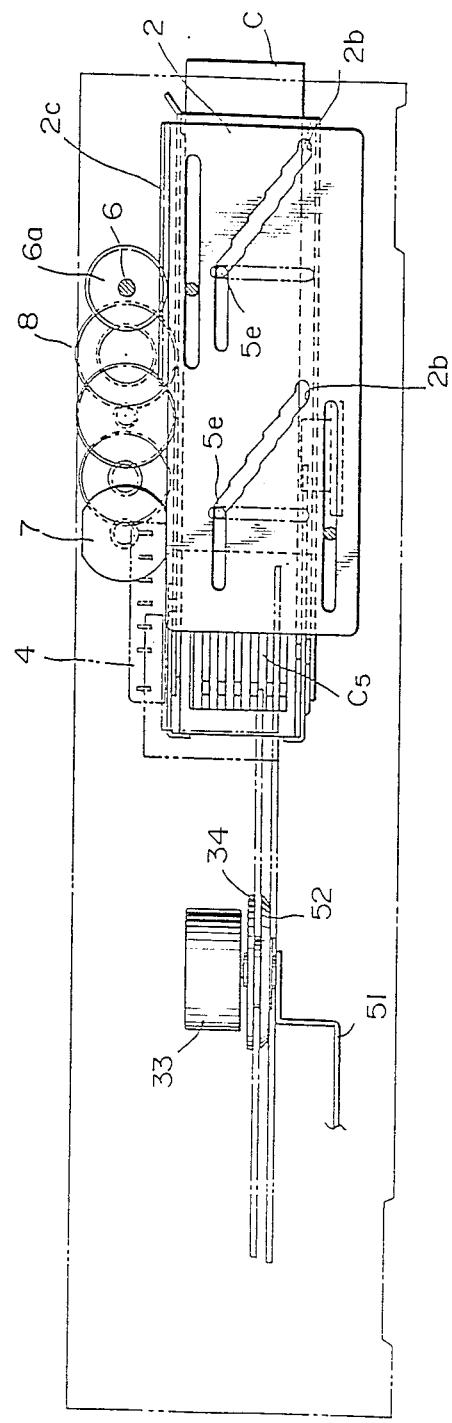
Figure 16:
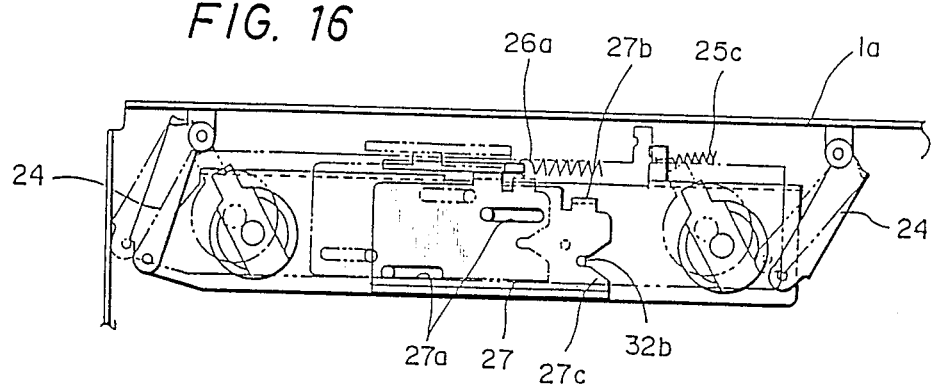
Figure 17:
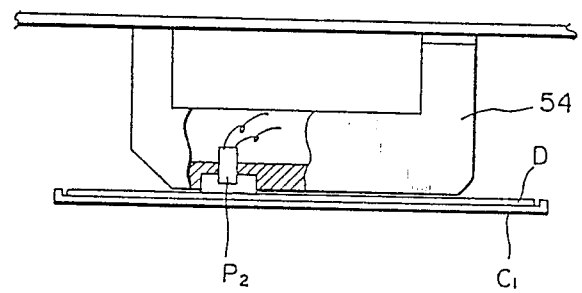

Reference numeral 53 in FIGS. 1 and 14 designates a leaf spring fixed to the frame 1 for urging the clamper 52 toward the spindle table 34. A guide body 54 (FIGS. 6, 10 and 11) is fixed to the upper plate 1a so as to serve as a guide for guiding the disc mount plate $C_1$ when the latter is pushed out of the case $C_3$ of the magazine C.

A photocoupler $P_2$ is provided on the guide body 54 in a travelling path of the disc mount plate $C_1$. When the disc P passes over the photocoupler 1, reflection light is detected to acknowledge the travel.

Operation in the main player body B will next be described.

Each of the discs D is placed on respective ones of the disc mount plates $C_1$ of the magazine C, and it is inserted into the main player body. B through a magazine insertion opening $B_1$.

The magazine C thus inserted is brought into the magazine holder 5, and pushes the bent portion 9b of the arm 9 to rotate the same. Upon complete installation of the magazine C into the magazine holder 5, switch $SW_1$ is closed.

Then, the motor 7 is operated, so that the slide plates 2 and 3 are displaced frontwardly through the gears 6a, 6b.

By the displacement, the other end 12c of the locking arm 12 is disengaged from the recessed portion 2d of the slide plate 2, and the locking end 12b of the locking arm 12 is moved into the interior space of the magazine holder 5 by the biasing force of the spring 12a. The locking end 12b is entered into a recess $C_4$ of the magazine C to fix the magazine C in a position.

At the same time, the pin 5e of the magazine holder 5 is pushed by the cam slots 2b of the slide plates 2, 3, and reaches the terminal end of the cam slots 2b, i.e., to the lowermost position. Therefore, the magazine holder 5 is moved to the lowermost position while it is maintained in a horizontal direction.

When completing the displacement of the slide plate 3, the switch $SW_2$ is actuated, and upon detection of the lowermost position, the motor 7 is deenergized, and the magazine holder 5 is held at a position.

Next, when the remote control unit F issues a play command for playing the desired disc D, the photo-sensor $P_1$ reads out the marking plate 4 of the slide plate 3, and the motor 7 drives the disc mount plate $C_1$ which mounts thereon the desired disc D, so that the disc mount plate $C_1$ is moved upwardly to a position coincident with the position of the rotation arm 17a of the push arm 17. The motor 7 is deenergized in response to an instruction associated with the photosensor $P_1$ which detects the mark plate, and concurrently, the motor 15 is energized.

In this instance, projecting pin 21c is engaged with the guide slot 23b of the regulation plate 23, so that the slide plate 21 is prevented from its sliding movement. Therefore, the dual face gear 18 is maintained in a non-rotational state.

When the rotation of the motor 15 is transmitted to the small gear 19, the planetary gear 20 provides orbital movement around the small gear 19, since the dual face gear 18 is not rotatable. Therefore, the push arm 17 is rotated, and the rotation arm 17b of the push arm 17 passes through a side hole $C_5$ of the magazine C to push the side surface of the disc mount plate $C_1$.

Figure 10:
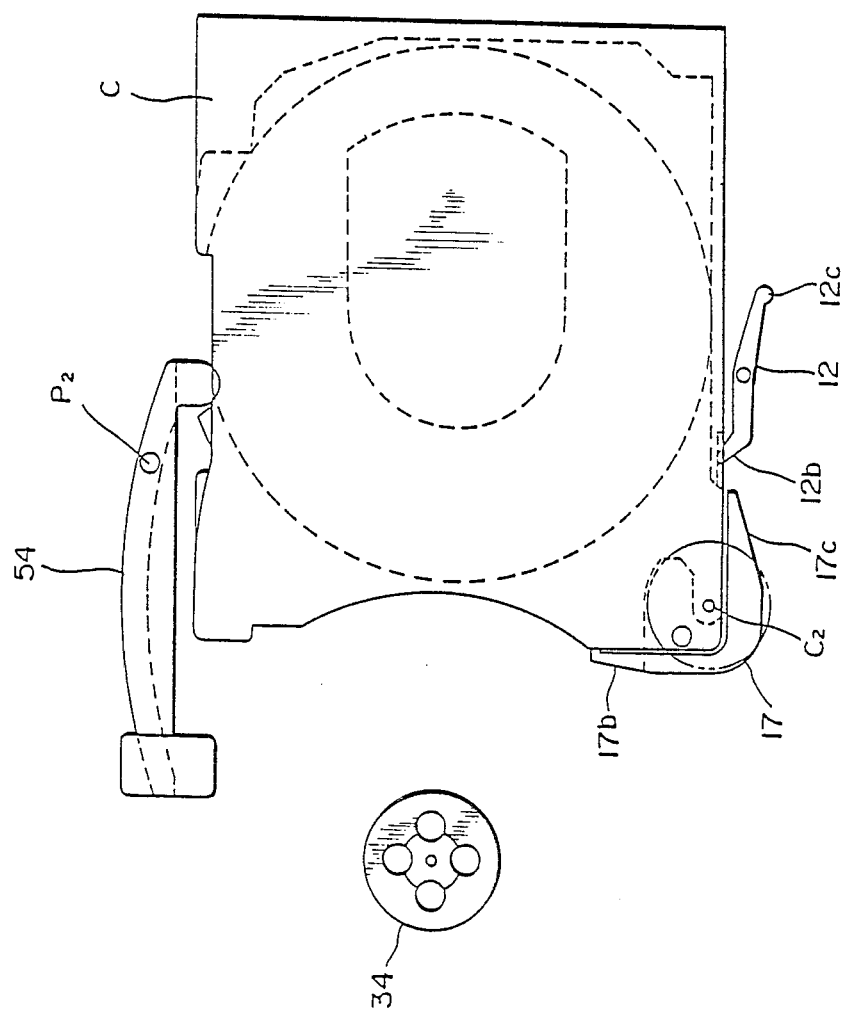
Figure 11:
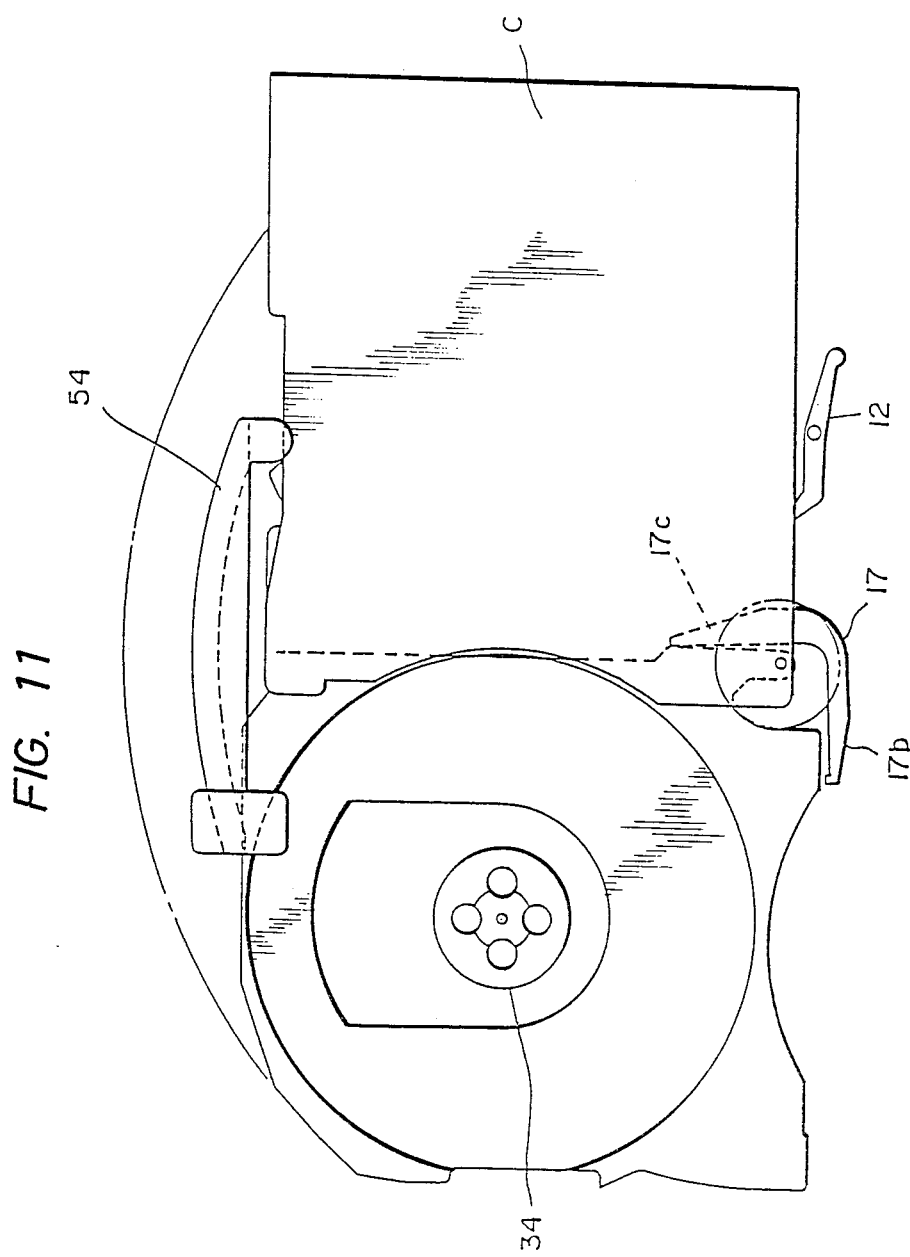
Figure 12:
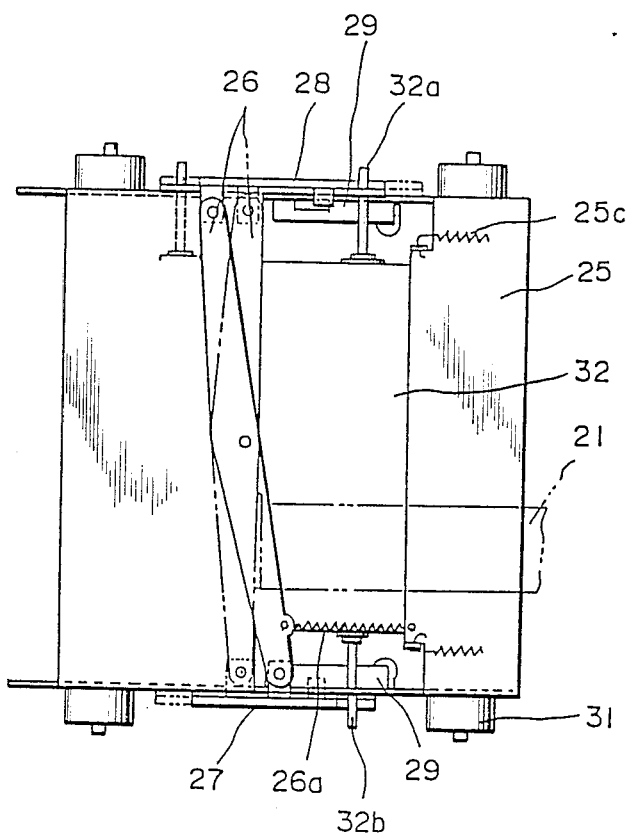
Figure 13:
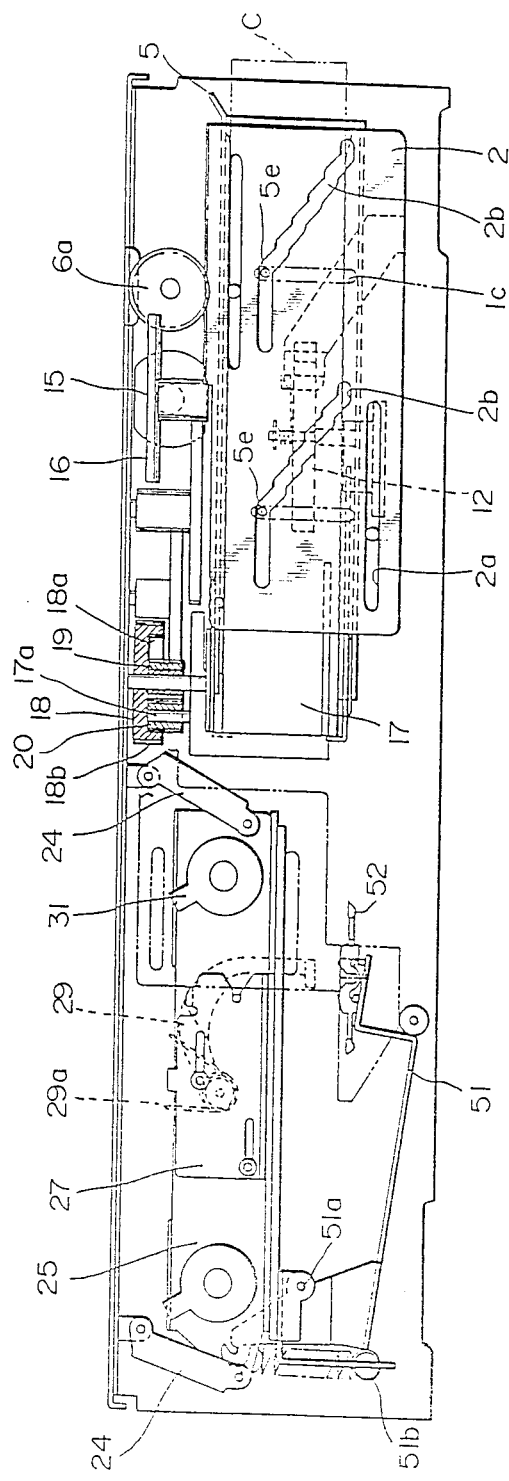

Accordingly, the disc mount plate $C_1$ mounting the desired disc D slides over the guide plate 54 and is rotated by 90 degrees between the configurations shown in FIGS. 10 and 11, so that the plate $C_1$ is pushed outside of the case $C_3$.

In this case, the photo-coupler $P_2$ performs acknowledgement of the existence of the disc D on the disc mount plate $C_1$. If the disc D is not mounted on the disc mount plate, the motor 15 is immediately rotated in the reverse direction, to rotate push arm 17 in an opposite direction.

Then, the push arm 17c pushes the disc mount plate C to an opposite direction for returning the plate C to the case $C_2$, and at the same time, the return of the plate C is displayed at the remote control unit F, and accordingly, the listener can acknowledge, non-existence of the desired disc.

If the travel of the disc D is detected by the photo-coupler $P_1$, rotation of the motor 15 is continued, and the disc mount plate $C_1$ is moved by 90 degrees by the pushing out operation of the rotation arm 17b.

As described above, when the push arm 17 is rotated by 90 degrees, rotation of the projection pin 17d is rotated by 90 degrees, rotation of the projection pin 17d is linked to the guide slot 23c of the regulation plate 23 on that the regulation plate 32 is moved along the guide slot 23a by the projection pin 17d during rotation of the push arm 17. As a result, the projection pin 21c of the third slide plate 21 is brought to the corner portion of the guide slot 23b of the regulation plate 23.

Accordingly, the internal gear 18a of the dual side gear 18 becomes rotatable. The rotation of the internal gear 18a is transmitted to the rack 21b, and the tip end 21e of the slide plate 21 abuts against the lateral plate portion 25a of the holder 25 and the side face of the fixing arm 26 to urge the same.

As a result, the holder 25 rotates the suspension arms 24. When the holder 25 abuts, the side of the suspension arm 24, it cannot rotate the holder 25 any more.

Further, when the fixing arm 26 is rotated against the biasing force of the spring 26a by the tip end 21e of the slide plate 21, the fixing plates 27, 28 are displaced, and the V-shaped fixing groove 27c is spaced away from the protruding shaft 32b, to render the fixing plates free, so that the carriage plate 3e is supported by the spring 32c and the damper 30, and external vibration is absorbed by the damper 30.

Completion of the operations attendant to the movement of the slide plate is detected by a switch $SW_3$ actuated by the projection piece 21d of the slide plate 21.

On the other hand, the rack 13b of the second slide plate 13 is in meshing engagement with gear 18 the external gear 18b of the dual side. When the external gear 18b is in the non-rotatable state, the cam face 14a of the clamper push-down cam 14 connected to the slide plate 13 is in contact with the clamper support plate 51, to push the plate 51 downwardly against the biasing force of the spring 51b.

Therefore, the clamper 52 is spaced away from the spindle table 34.

However, when the external gear 38 is rotated, the slide plate 13 is also slidingly moved to rotate the clamper push-down cam 14. In this case, as shown in FIG. 14, the lower vertical level portion of the cam surface 14a is brought into camming contact with the clamper support plate 51, and the clamper 52 is moved toward the spindle table 34 by the biasing force of the spring 51b.

In this case, the leaf spring 53 assists the clamper 52 to come close to the spindle table 34 in horizontal direction.

Prior to the displacement of the fixing plates 27, 28, the tip end 29b of the support arm 29 is in contact with the upper surface of the disc D fed by the rotation of the disc mount plate $C_1$, the tip end 29b being provisionally moved downwardly by the fixing plates 27, 28.

However, simultaneous with the upward movement of the clamper 52 as described above, the tip end 29b of the support arm 29 is upwardly moved away by the sliding movement of the fixing plates 27, 28, so that the disc D is pushed upwardly by the clamper 52, and is set on the spindle table 34.

When the completion of this operation is detected by the switch SW$_3$ as described above, the spindle motor 33 is rotated for driving the disc D, and at the same time, the feed screw 46 is rotated by the motor 43 for driving the pick-up member 36 toward the tracking direction along the guide rail 35 so as to perform reproduction of the disc D.

If the disc reproduction is finished, or if the remote control unit F sends a reproduction-stop command or disc return command to the magazine C, a reversal operation is started. That is, the disc D is mounted on the disc mount plate C$_1$, and thereafter, the disc mount plate C$_1$ is returned to the case C$_3$.

And, the magazine C is again moved to the lowermost stand-by position.

Next, if magazine ejection command is issued, the slide plates 2, 3 slide in an opposite direction by the reversal rotation of the motor 7, so that the magazine holder 5 is moved to the uppermost position. Simultaneously, the other end of the locking arm 12 is brought into contact with a protruded surface other than the recessed portion 2d, so that the locking end 12b is retracted toward outside of the magazine holder 5 against the biasing force of the spring 12a.

For this, the magazine C is brought to an unlocked state, so that the magazine C is pushed by the bent portion 10a of the rotation arm 10, thereby to be ejected outside of the main player body B.

Incidentally, the carriage 32 is formed with the opening 32d which has an open space at least equal to the displacing area range of the main pick-up body 37, since the main pick-up body 37 must read out the signal from the disc D set on the spindle table 34.

In view of the above, a cover plate 61 is fixed to the carriage plate 32 for preventing oil coated on the each parts of the carriage plate, 32 or other segments from being scattered and adhering to the main pick-up body 37. The cover plate 61 is provided with a partition wall 61a for supporting electrical conductor lines reaching to the spindle motor 33 and the pick-up member 36. The cover plate 61 also serves to enhance the mechanical strength of the carriage plate 32

Figure 27:
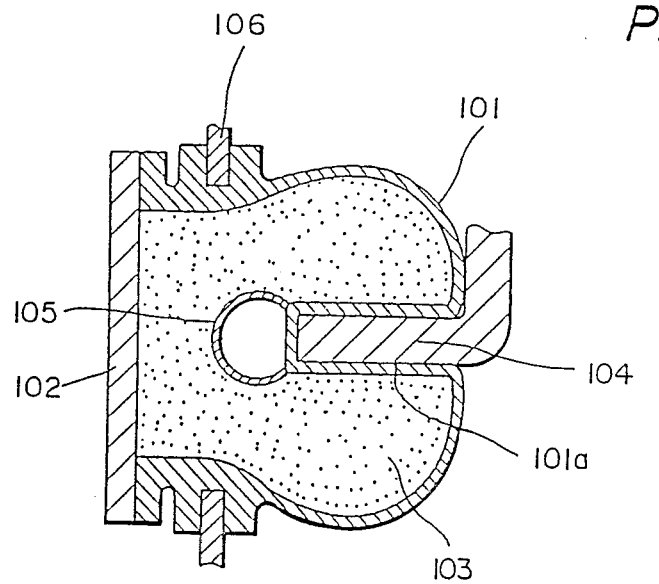
FIG. 27 is a cross-sectional view of a conventional damper.
Figure 28:
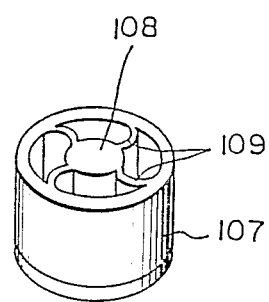
FIG. 28 is a perspective view of a damper according to another conventional device.

Conventional dampers used in a supporting apparatus in a disc player of this type are shown in FIGS. 27 and 28.

The damper is provided with a closed space defined by a container portion 101 and a lid member 102. Viscous fluid 103 such as silicone or oil, etc., is filled in the closed space.

A portion of the container portion 101 is bulged into the viscous fluid 103, and the buldged portion 101a is fitted with a projection 104 extending from a carriage plate. The projection 104 functions as a brake member for agitating the viscous fluid 103.

Further, gas is confined in the viscous fluid 103 and a volume changeable hollow member 105 formed of rubber etc. is disposed in the viscous fluid. The volume changeable hollow member 105 is connected to the projection 104 through the buldged portion 101a.

The outer surface of the container portion 101 is coupled to a hole of a holder 106, so that the carriage plate is supported by the holder 106 through the damper.

On this damper, the volume changeable hollow member 105 is expanded or shrunk together with the expansion and shrinkage of the gas confined therein in response to the temperature change of the viscous fluid 103, so that moving resistance of the projection 104 as a brake member relative to the viscous fluid is increased or decreased.

Further a damper shown in FIG. 28 includes an outer sleeve 107 fixed to the holder 106, an inner sleeve 108 fixed to the projection 104, and a plurality of thin wall bending segments 109 each bridging between the outer and inner sleeves.

The damper of this type served to attenuate vibration and impact by the bending resistance of the thin wall bending segments 109.

According to the conventional dampers, when the external impact and vibration are applied to the holder 106, the fluidity resistance of the viscous fluid 104 relative to the buldged portion 104 and bending resistance of the container portion 101 only perform damper function against a large change in amplitude of the vibration and impact.

Further, on the damper shown in FIG. 28, only the thin wall bending pieces 109 provide bending resistance for dampening.

Such resistance is not changeable in accordance with the change in amplitude and impact.

Figure 29:
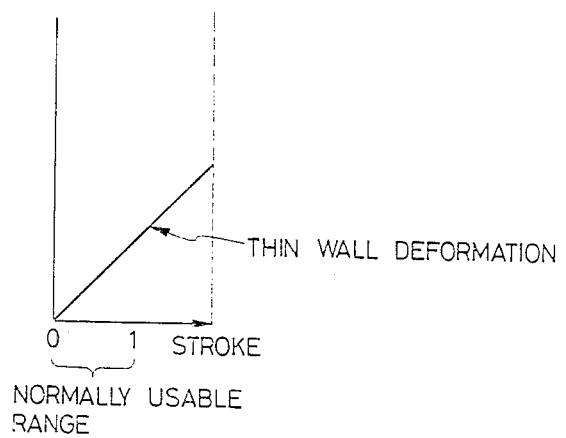
FIG. 29 is a graph showing the relationship between the stroke - attenuation force in the dampers shown in FIGS. 27 and 28.

Therefore, resistance for absorbing the impact or vibration, that is, attenuation force is linearly changed as shown in FIG. 29 wherein the ordinate and abscissa represent attenuation force and amplitude, respectively.

However, attenuation force is required to be increased against a large amplitude of vibration and impact, in comparison with the attenuation force against the small amplitude. The above-described dampers do not exhibit such function.

It is one of the objects of this invention to overcome the above-described drawback in the conventional supporting apparatus in the disc player, and to provide an improved apparatus in which attenuation force against the vibration and impact can be increased at high rate when the impact force exceeds a predetermined amplitude, and such impact and vibration are not transmitted to the carriage plate, thereby preventing the destruction of the supporting apparatus.

Figure 21:
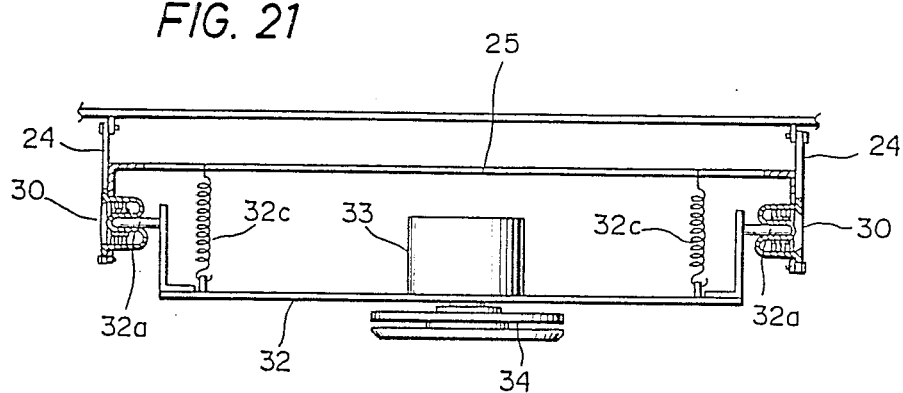
Figure 22:
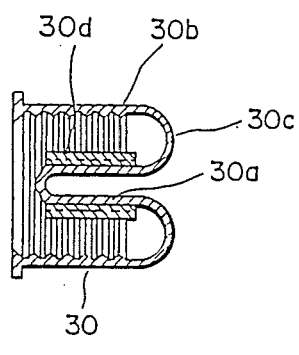

In order to attain the above-described objects, the damper of the present invention includes a first damper portion, a second damper portion and a cup-shaped thin, wall portion. The first damper portion is provided at either a carriage plate and a holder and has a plurality of pleat-like projections formed on an annular surface. The second damper portion is provided at the remaining one of the holder and the carriage, and is provided with an annular portion which confronts, with a gap, the pleat-like projections. The cup shaped thin wall portion is provided at one of the first and second damper portions. When large amplitude vibration is applied to deform the thin wall portion, the annular portion is brought into contact with the pleat-like projections to increase the attenuation force. Details of the damper 30 used in the above-described multi-disc player will next be described with reference to FIGS. 21 and 22.

The damper 30 is provided with a central bore 30a into which a projection shaft 32a of the carriage plate 32 or of the subordinate plate 44 is inserted. The damper 30 also includes an outer sleeve portion 30b fixed to the holder 25. The inside of the outer sleeve portion 30b is formed to be undulatory to provide annular pleats. The central bore portion 30a is provided integrally with the outer sleeve portion 30b and they are composed of an elastic material such as an anti-vibration rubber. A thin integral cup-shaped portion 30c is provided to connect the central bore portion 30a and the inside sleeve portion 30b. Further, the outer surface of the central bore portion 30a is fitted with a cap 30d whose elasticity is higher than that of the anti-vibration rubber.

Therefore, the cup-shaped portion 30c has sufficient flexibility. Even if vibration or impact force is applied to the outer sleeve portion 30b, such external load is not transmitted to the carriage plate 32 mainly because of the deformation of the cup-shaped portion 30c, and partly, because the suspension of the carriage plate 32 from the holder 25 by the spring 32c can prevent the weight of the carriage plate 32 from being transmitted to the damper 30.

Since a gap is provided between an inner peripheral surface of the cap 30d and the outer sleeve portion 30b, the inner peripheral surface of the outer sleeve portion 30b may contact with the cap 30d due to extremely large amplitude of vibration and impact applied to the outer sleeve portion 30b, and due to extreme offset between the central axis of the outer sleeve portion 30b and the axis of the central bore portion 30c which cause large bending in the cup-shaped portion 30c.

In this case, since the cap 30d provides high vibration absorbing property, the damper function is provided by the cap 30d as well as by the flexible bending of the cup-shaped portion 30c.

Figure 25:
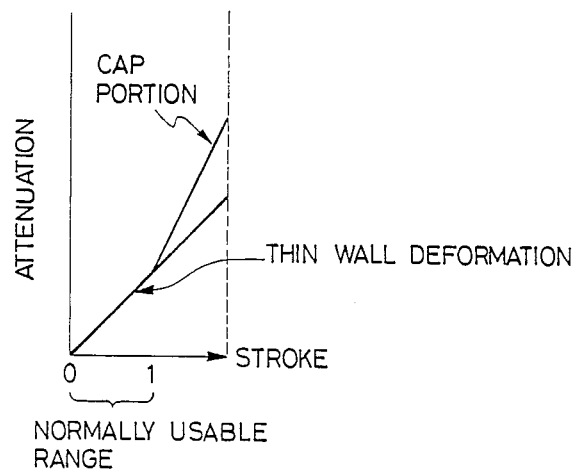
Figure 26:
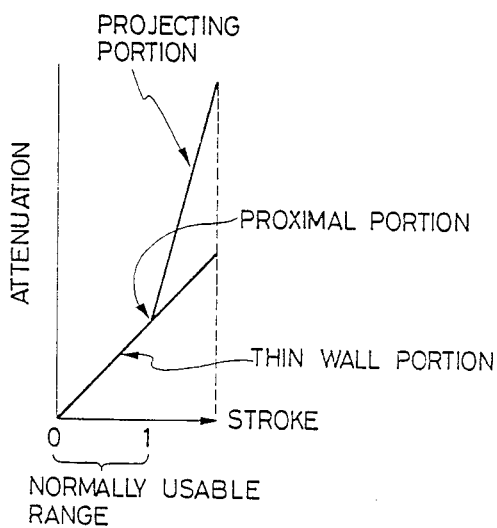

Therefore, as shown, by attenuation-stroke line shown in FIG. 25 wherein the ordinate and abscissa represent attenuation force and stroke, respectively, the attenuation force after the inner peripheral surface of the outer sleeve portion 30b contacts the cap 30d, increased rapidly in comparison with the attenuation force before the contact. Accordingly, the damper always provides optimum dampening function against both large and small vibration and impact force. Incidentally, instead of the above-described cap 30d, a plurality of radially arranged ribs can be provided which are arranged to be spaced from each other in a space defined between the inner peripheral surface of the central bore portion 30a and the outer sleeve portion 30b.

Figure 23:
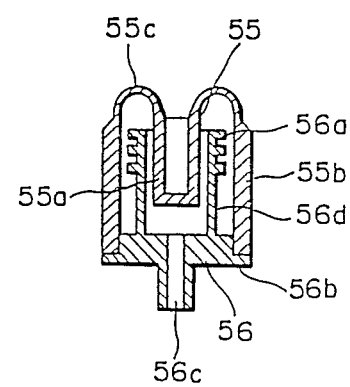
Figure 24:
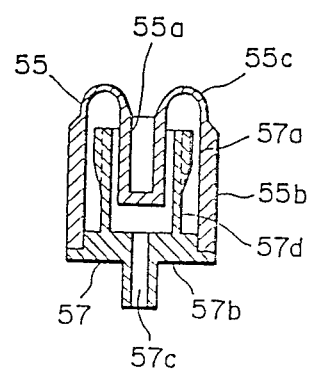

FIGS. 23 and 24 show two-piece structures consisting of a cup-shaped member 55 provided with a central bore 55a fitted with the projection shaft 32a of the carriage or subordinate plate, and an end cylindrical, member 56 or 57 having annular portions 56d, 57d extending axially from that end. The cylindrical member 56 shown in FIG. 23 is provided with a plurality of annular ring members 56a formed on the annular portion 56d, and the cylindrical member 57 shown in FIG. 24 is provided with a plurality of axial ribs 57a radially arranged on the annular portion 57d.

Outer cylindrical portions 55b of the cup-shaped members 55 are fixedly bonded to outer surfaces 56b, 57b of the cylindrical members 56, 57. The outer cylindrical portions 55b are maintained to be spaced apart from the annular ring members 56a and ribs 57b by the cup-shaped portions 55c.

Air vent holes 56c, 57c are formed in the end cylindrical member 56, 57. The cylindrical members 56, 57 are fixed to the holder 25.

Therefore, when the annular ring members 56a or the ribs 57a are brought into contact with the inner peripheral surface of the outer cylindrical portion 55b due to large amplitude of vibration and impact force, firstly, deformation of the annular portions 56d, 57d is applied in addition to the deformation of the cup-shaped portion 55c, and further, the deformation of the rings 56a and ribs 57a are added in accordance with the increase in amplitude. Therefore, there is obtained an attenuation force - stroke relationship, which graph is similar to that shown in FIG. 25.

According to the present invention, as described above, deformations of the ribs or rings are also applied if the external vibration and, impact exceed a predetermined level, to thus increase the attenuation force.

This increased ratio in attenuation force is much higher than a linear increase ratio prior to the change. Therefore, even large vibration and impact force can be attenuated.

Accordingly, such large vibration and impact force is not transmitted to the carriage plate, so that the positional relationship is accurately maintained between the disc rotating on the carriage plate and the pick-up. As a result, sound jumping, defocusing, noise generation and other deficiencies in sound reproduction are avoided.

A conventional pick-up driving mechanism in a disc player of this kind will be described with reference to FIG. 36.

A rack 203 is fixedly secured to a tip end of a leaf spring fixed to a pick-up member 201 movable along a guide rail on a carriage plate mounting a spindle shaft etc. The rack 203 is in abutment with a feed screw 204 along the horizontal direction, and is engaged therewith by a spring force acting in the vertical direction. By the rotation of the feed screw 204, the rack 203 is moved to thereby feed the pick-up member 201 in a tracking direction.

Figure 36:
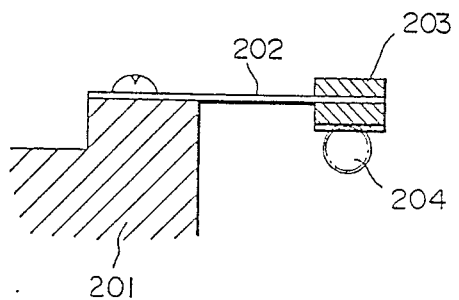
FIG. 36 show the prior art screw feed mechanism.

In the conventional pick-up driving device shown in FIG. 36, the rack 203 is in abutment with the feed screw in a horizontal direction, and the rack 203 is biased toward the feed screw 204 in a vertical direction. With this structure, rattling of the rack against the feed screw in vertical direction can be prevented. However, the pick-up position may be changed by the rattling in the horizontal direction due to external vibration. To overcome the above-described drawback in the conventional pick-up driving device in a disc player, according to the present invention there is provided an improved device in which rattling of the rack in vertical and horizontal directions relative to the feed screw can be eliminated by biasing the rack toward the feed screw in an oblique direction in addition to the slant abutment of the rack with respect to the feed screw.

According to the present invention, a rack surface is obliquely engaged with the feed screw member with respect to the fulcrum point of the pick-up member. The contact pressure of the rack against the feed screw provides a first component of force which is directed toward the fulcrum point of the pick-up member in order to eliminate horizontal rattling, and second component of force which is directed perpendicular to the first component in order to eliminate vertical rattling.

Explanation will be made with respect to a rack 49 engageable with a feed screw 46 and fixed to a pick-up member 36 of the multi-disc player described above.

Figure 30:
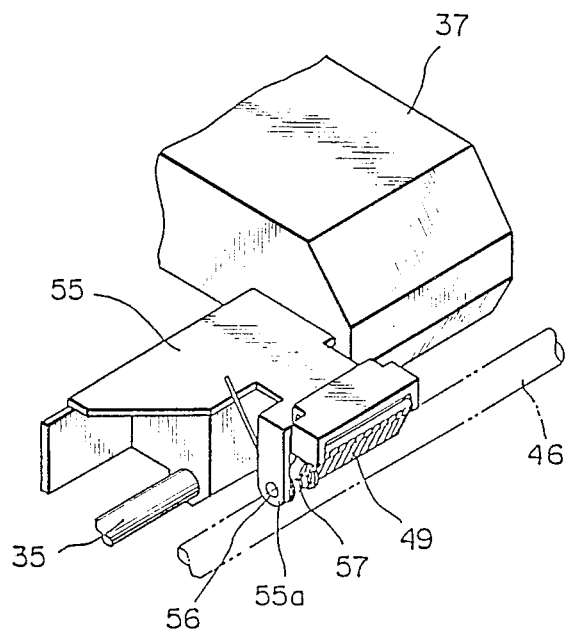
FIGS. 30 to 35 show modifications of the present invention.
Figure 31:
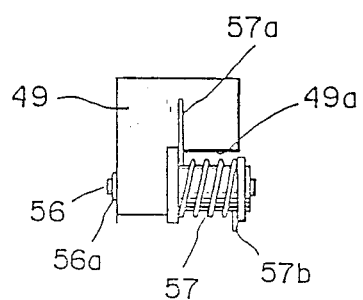
Figure 32:
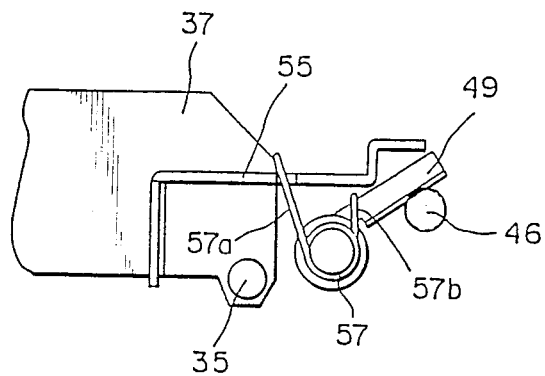

As shown FIGS. 30-32, a rigid rack fixing plate 55 is fixed to a pick-up body 37 of a pick-up member 36. The rack fixing plate 55 is provided with a suspended portion 55a which holds a shaft 56 around which an axial bearing of the rack 49 is rotatably supported.

The axial bearing of the rack 49 is formed with a recessed portion 49a, and a compression spring 57 having two leg pieces 57a and 57b is disposed over the shaft 56. One of the leg pieces 57a is secured to the rack fixing plate 55 while the other leg piece 57b is secured to the rack 49, so that the rack 49 is urged in the direction to provide engagement with the feed screw 46.

By the stretching force of the compression spring 57, the rack 49 is urged toward one of E rings 56a, so that rattling of the rack 49 in the axial direction is eliminated.

Since the threads of the feed screw 46 and the rack 49 have triangular cross-sections, the component of force produced by sliding resistance of the pick-up member 36 urges the rack 49 in a direction spaced away from the feed screw 46.

Biasing force produced by the winding direction of the compression spring 57, which biasing force is produced by the locking of the leg pieces 57a, 57b, urges the rack 49 toward the feed screw 46 against the above component of force, to thereby eliminate the generation of a gap between the rack 49 and the feed screw 46. As a result, the rack 49 is accurately operated by the rotation of the feed screw 46.

Further, in the meshing engagement state between the rack 49 and the feed screw 46, the tooth surface of the rack 49 is directed obliquely with respect to a line connecting between the rack tooth surface and the one of the guide rails 35 (FIG. 19), acting as a fulcrum, which is positioned opposite the other guide rail 35 adjacent to which the rack 49 is fixed to the pick-up member 36.

As described above, resistive force is provided at a contact surface between the rack 49 and the feed screw 46. The resistive force is directed in a direction perpendicular to the contact surface.

However, since the rack tooth surface is obliquely directed, two components of forces are generated with respect to the guide rail 35 in the horizontal and vertical directions.

The component of force in the horizontal direction is adapted to eliminate rattling due to external vibration applied in the horizontal direction, and the component of force in the vertical direction is adapted to eliminate rattling due to external vibration applied in the vertical direction. Therefore, by the abutment of the rack 49 to the guide rail in the oblique direction rattling in horizontal and vertical directions are eliminated during movement of the pick-up member 36.

Figure 33:
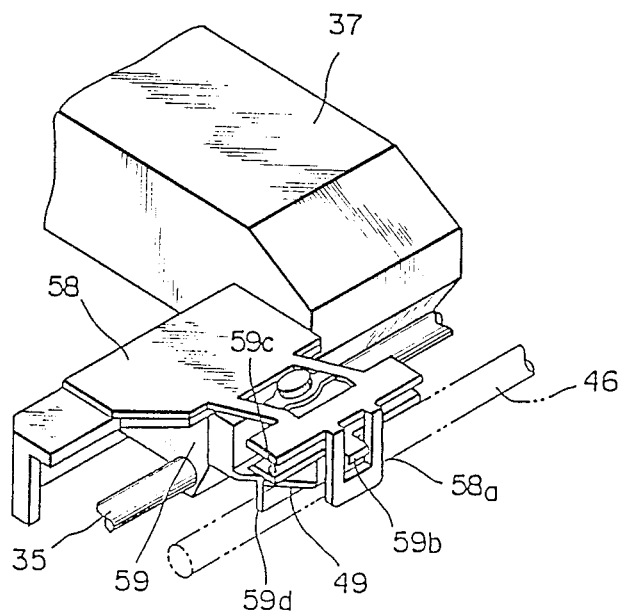
Figure 34:
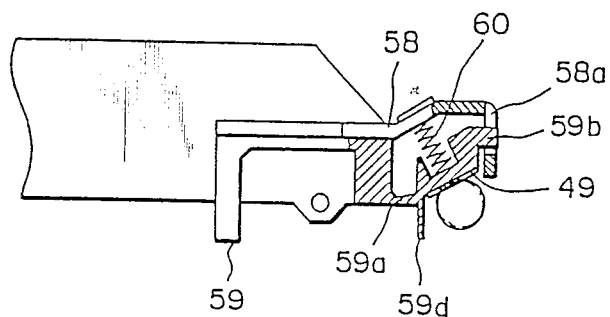
Figure 35:
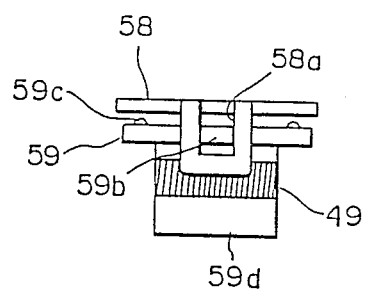

FIGS. 33 thru 35 show another embodiment of a rack 49. The pick-up body 37 is provided with a rigid support segment 58 and a rack body 59 forming a rack 49 and made of resin such as polyacetal, etc. Teeth of the rack 49 are also obliquely directed.

Thin wall portion 59a is provided at a portion of the rack body 59. The rack 49 is resiliently supported, and a compression spring 60 is accommodated between the rack body 59 and the support segment 58. The spring 60 urges the rack 49 toward the feed screw 46 for providing compressive contact therebetween.

The rack body 59 is formed with a protrusion 59b which extends through a rectangular hole 58a of the support segment 58. As a result, rattling of the rack is eliminated when the pick-up member 36 is moved to its tracking direction, and movement of the rack 49 by the rotation of the feed screw 46 is accurately transmitted to the pick-up member 36.

Further, at an upper surface of the rack body 59, left and right projections 59c are provided, which may contact with a lower surface of the support segment 58. Such structure prevents the rack 49 from obliquely contacting with the feed screw 46.

This another embodiment also provides function and effect similar to those in the foregoing embodiment. Incidentaly, reference numeral 59d designates a partition wall which prevents oil coated on the feed screw 46 from adhering onto the main pick-up body due to the oil dispersion for avoiding any hindrance in signal reading.

As described above, in the present invention, the rack surface engaged with the feed screw is inclined with respect to a line connecting the rack surface and the guide rail which supports the pick-up member.

Therefore, components of the force in the horizontal and vertical directions are applied to the feed screw, so that rattlings in horizontal and vertical directions are eliminated due to the external vibration and positional displacement of the pick-up can be avoided.

As a result, there are no positional displacement of the pick-up member due to the rattling which is caused by floating of the rack, and the pick-up member can be smoothly moved in the tracking direction.

Referring back to FIG. 36, the feed screw 204 and the rack 203 have threads having a triangular cross-section. Therefore, driving force of the feed screw 204 against the rack 203 produces a component of force in a vertical direction along which the rack 203 is moved away from the feed screw 204.

Therefore, the rack 203 may float against the biasing force of the leaf spring 202, so that rattling may occur at the meshing zone between the feed screw 204 and the rack 203. Further, if vibration is applied during the driving operation, the vibration and the vertical component of force may be combined to distort the leaf spring 202, so that the tip end of the rack 203 in its running direction may float, to thus displace the pick-up member from its predetermined position.

In order to overcome the above-described drawbacks in the conventional pick-up driving mechanism of the disc player, according to this invention it is possible to avoid positional displacement of a pick-up due to floating of the rack with respect to the feed member and rattling at the engaging portion therebetween by supporting the rack under pressure relative to the feed screw.

As described above, according to the present invention, the rack is movably supports the pick-up member in a direction perpendicular to a feeding direction of the feed screw, and the rack is urged by the biasing member for positively providing meshing engagement between the rack and the feed screw.

Accordingly, even though the rack is subjected to floating force due to the triangular cross-sectional threads of the racks and feed screw, the biasing member urges the rack in a direction opposite the floating direction, so that the rack is deeply engaged with the feed screw with accurate meshing engagement.

Therefore, rattling between the rack and the feed screw and floating of the rack are avoided. Further, oblique meshing between the rack and the feed screw is not provided.

As a result, the pick-up member is accurately moved along the tracking direction by the axial rotation of the feed screw, and therefore positional displacement between the vibromotive segments and defocusing may be absent, and accurate signal reproduction can be provided.

In a conventional disc clamp apparatus, a protrusion projecting from either a clamper or a spindle table extends into a clamp hole formed at a central portion of a disc, so that the disc is clamped under pressure between the clamper and the spindle table.

According to such a conventional clamp apparatus, the disc may be disengaged from either the clamper or the spindle table during disc transfer, thus failing to confront the head due to application of external vibration in rough, road running in case the disc player is installed at a vehicle. This disengagement arises since the protrusion engaged with the clamp hole of the disc only extends from one of the clamper and the spindle table. Therefore, the disc is not able to be clamped in the horizontal direction at the worst, the disc may be released and dropped and may be damage by such effects as scoring.

It is one of the objects of this invention to overcome the above-mentioned drawbacks and to provide an improved disc clamp device in a disc player, in which confronting surfaces of the clamper and the spindle table are formed with protrusions having external dimension approximately equal to that of clamp holes of the disc. Even if the disc is disengaged from protrusions extending from one of the clamper and the spindle table due to external vibration, remaining protrusions extending from the remaining one of the spindle and the clamper still engage the clamp hole. Therefore, the disc can be sufficiently clamped in the horizontal direction without any deviation.

In order to attain the above-described objects in the present invention, confronting surfaces of the clamper and the spindle table are provided with tapered protrusions, and one of the outer dimensions of the protrusions is approximately equal to the diameter of the clamp hole formed in the disc for providing stable position of the disc.

Figure 37A:
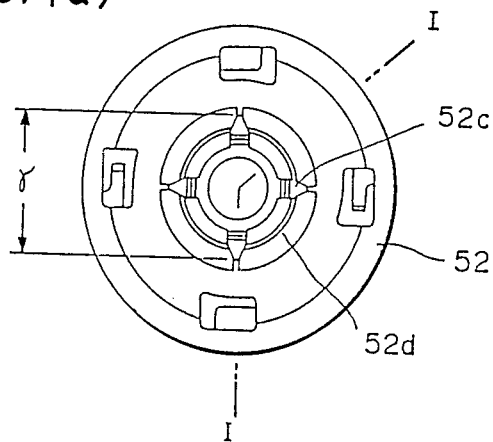
FIGS. 37, a and b, to 39 show a clamper device according to the present invention.

In the above-described embodiment, details of a clamp device for rotatingly driving disc will be described with reference to FIGS. 37 through 39.

A disc clamp device includes a spindle table 34 and a clamper 52. The spindle table 34 is fixedly secured to a rotation shaft 33 of a spindle motor 33, and a clamper 52 is rotatably supported on a clamper support plate 51, similar to the conventional device. The difference between the conventional device and this invention resides in confronting surfaces of both spindle table 34 and the clamper 52 on which an improvement is made in this invention.

Figure 37B:
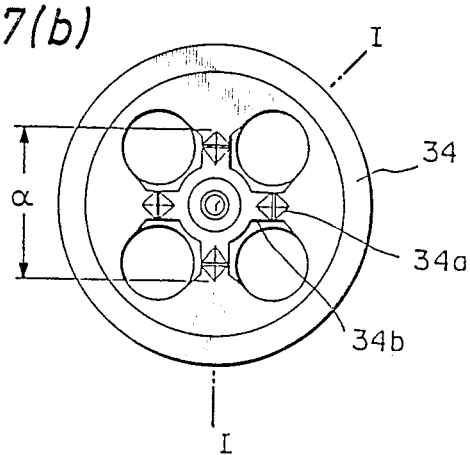

That is, a spindle table's surface confronting with the clamper 34 is formed with four tapered projections 34a angularly spaced away from each other by every 90 degrees as shown in FIG. 37(b), and the surface of the spindle table is also formed with recessed portions 34b each positioned in the vicinity of each of the projections 34a. As described later, projections 52c of the clamper 52 are inserted into the recessed portion 34b. Further, a distance defined between diametrically opposite sides of the projections 34a is approximately equal to a diameter $\beta$ of a clamp hole $D_1$ formed in the disc D. The projections 34a of the spindle table 34 define a position of the disc D.

On the other hand, the clamper 52 is fixed to a leaf spring 52b which is loosely supported on a fixing member 52a fixed to the clamper support plate 51. Further, a surface of the clamper 52 confronting the spindle table 34 is formed with four tapered projections 52c angularly spaced away by 90 degrees from each other. The latter surface is also formed with recessed portions 52d into which the projections 34a of the spindle table 34 are inserted.

Incidentally a distance $\gamma$ between diametrically opposite sides of the projections 52c is smaller than the disc clamp hole $D_1$ of the disc D.

Figure 38:
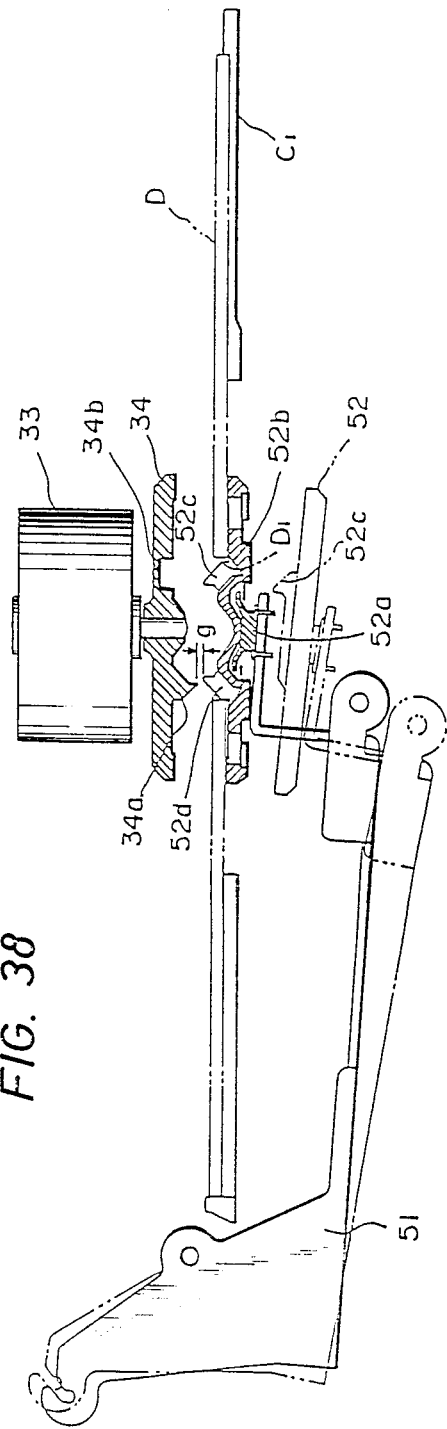

As shown in solid line in FIG. 38, when the clamper support plate 51 is rotated in a counterclockwise direction, projections 52c of the clamper 52a are inserted into the clamp hole $D_1$ of the disc D, and the disc D is upwardly spaced away from the disc mount plate $C_1$. In this case, projecting lengths of the protrusions 34a and 52c are determined in such a manner that a gap g defined between tip ends of the projections 34a of the spindle table 34 and the tip ends of the projections 52c of the clamper 52 is smaller than a thickness of the disc D.

Thus, when the disc mount plate $C_1$ is drawn from the magazine C for clamping the disc D, the clamper support plate 51 is rotated from its position shown by a phantom line in FIG. 38 to a position shown by the solid line. Therefore, the projections 52c of the clamper 52 are inserted into the clamp hole $D_1$ of the disc D. At the same time, the clamper 52 is oriented from its inclined posture to its horizontal posture in order to move the disc D to a direction away from the disc mount plate $C_1$. In this state, since the distance g between the tip ends of the projections 34a and 52c is smaller than the thickness of the disc D, the clamp hole $D_1$ may not deviate from the projections 34a and 52c, even if the disc D is unstably floated over the disc mount plate $C_1$. As a result, sufficient disc clamping would be attainable.

Figure 39:
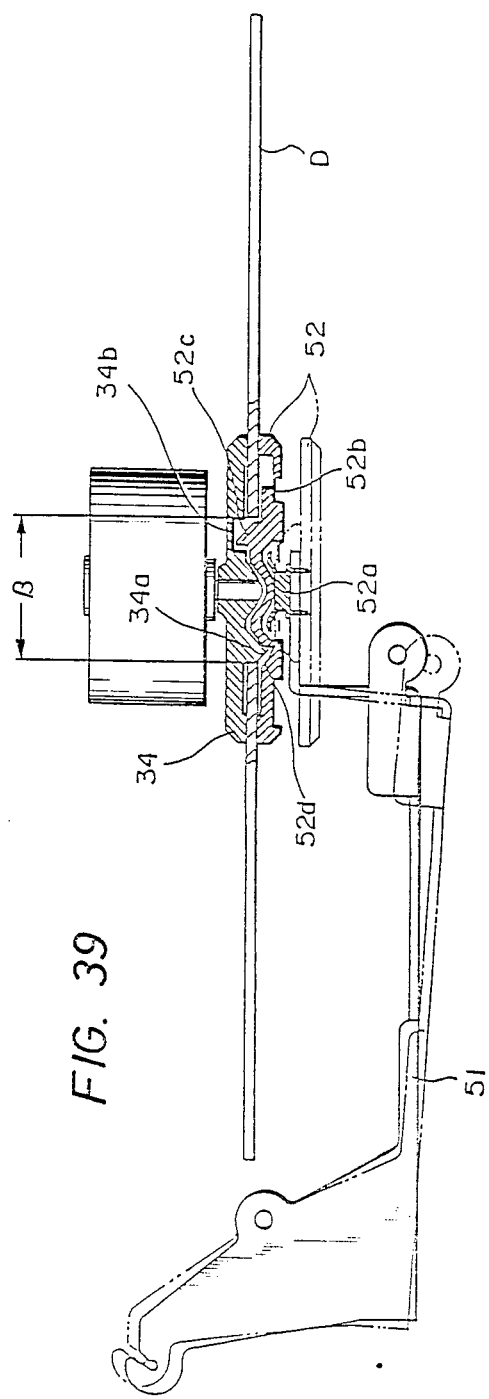

When the clamper support plate 51 is further rotated, the projections 34a and the projections 52c are inserted into the recessed portions 52d and 34b, respectively, as shown in FIG. 39. Therefore, the clamper 52 is under pressure contacted to the spindle table 34 interposing the disc D therebetween.

In this case, even if the projections 34a of the spindle table 34 exactly abut the projections 52c of the clamper 52, these are displaceable from each other because of the accute tip ends of the projections and the rotatable arrangement of the clamper 52. As a result, opposing projections 34a and 52c are brought into insertion into recessed portions 52d and 34b for clamping the disc.

In the disc clamping state, since the disc D is supported by the projections 34a of the spindle table 34 which is a driving side for the disc, the disc D is not eccentrically rotated, so that accurate tracking is attainable, even if there is offsetting relationship between the clamper 52 and the spindle table 34 due to dimensional error.

Further, in the above described embodiment, the distance g between ends of the projections 34a of the spindle table 34 and the projections 52c of the clamper is smaller than the thickness of the disc D. However, even if the distance g is equal to or larger than the thickness of the disc D, and the disc D is displaced from or released from the one of the protrusions (for example, projections 52c) due to generation of external vibration during clamping operation, confronting projections (for example, the projection 34a) are insertable into the clamp hole $D_1$ of the disc D, and therefore, the disc can be clamped in its horizontal orientation without any deviation.

As described above, according to the present invention, confronting surfaces of the clamper and the spindle table are formed with projections, and their projections have tapered tip end portions. Therefore, even if the disc is deviated or released from one of the projections due to application of external vibration, opposing projections are inserted into the disc clamp hole. As a result, the disc can be clamped in the horizontal direction without any deviation for ensuring disc clamping, and accurate tracking is obtainable.

What is claimed is:

1. A disc selection device in a multi-disc player, comprising:
    a magazine adapted to accommodate a plurality of discs therein;
    a holder for receiving said magazine in a magazine inserting direction and for holding said magazine;
    slide plates provided at both sides of said holder, said slide plates being formed with cam surfaces for moving said holder in a vertical direction which direction is perpendicular to the magazine inserting direction, said slide plates being also formed with racks;
    left and right gears engageable with said racks for driving said slide plates; and
    a shaft for connecting together said left and right gears to drive said slide plates in a same direction.

2. A disc selection device as recited in claim 1, wherein both said gears are mounted on said shaft.

3. A disc selection device as recited in claim 1, wherein said racks are formed on said slide plates substantially in a common plane and said shaft extends parallel to said common plane and mounts both said gears.

4. A disc existence acknowledgement device in a multi-disc player comprising:
    a magazine adapted to accommodate a plurality of disc therein;
    a transferring means which selects one of the discs in said magazine and transfer the selected disc to a playing position in a player;
    a guide member disposed at a disc path between said magazine and said player by the operation of said transferring means, said guide member restricting movement of said disc in a thickness direction thereof and guiding a moving of said disc along said disc path; and
    detection means provided at a position along said guide member for optically detecting passing of said disc toward said playing position along said disc path prior to arrival of said disc at said playing position.

5. A carriage supporting apparatus in a disc player, comprising:
    a carriage plate;
    a holder for supporting the carriage plate;
    a first damper portion provided at one of said carriage plate and said holder, said first damper portion having an annular surface and a plurality of annular pleat-like projections formed on the annular surface;
    a second damper portion provided at a remaining one of said holder and said carriage and having an annular portion which confronts, across space, said pleat-like projections of said first damper portion; and
    a cup-shaped thin wall portion disposed between said first and second damper portions.

6. A carriage supporting apparatus as recited in claim 5, wherein said space is vented to air.

7. A carriage supporting apparatus as recited in claim 6, wherein said carriage plate is formed with an aperture for receiving said first and second damper portions at ends thereof opposite said thin wall portions.

8. A pick-up driving device in a disc player comprising:
    a pick-up member movable on a carriage plate, said pick-up member being guided by a guide member;
    a feed screw member formed with a thread having triangular cross-section for moving the pick-up member; and
    a rack having a contact surface in contact with said feed screw and provided in said pick-up member, said rack contact surface being inclined with respect to a surface of said disc and a plane perpendicular thereto.

9. A pick-up driving mechanism in a disc-player comprising:
    a pick-up member movable on a carriage plate by a guidance by a guide member;
    a feed screw member for moving said pick-up member;
    a rack member having a substantially planar toothed rack surface rotatably supported by said pick-up member in a direction perpendicular to said feed screw member, said rack member being in meshing engagement with said feed screw member; and
    a biasing member having one end mounted on said pick-up member for urging said rack toward said feed screw member.

10. A disc clamp apparatus in a disc player including a clamper and a spindle table for clamping a disc therebetween characterized by;
    said clamper and said spindle table having surfaces confronting with each other, and each of said confronting surfaces being formed with tapered protrusions having an external dimension approximately equal to diameter of a clamp hole formed in said disc, and each of said confronting surfaces being also formed with recesses into which said protrusions of the other of said confronting surfaces are inserted.

11. A disc clamp apparatus as recited in claim 10, further comprising:
    a movable disc mount plate for carrying said disc and being movable to a first position intermediate said clamper and said spindle table;
    means for moving said clamper to a second position wherein said protrusions of at least one of said confronting surfaces penetrate said clamp hole of said disc while said disc mount plate at said first position continues to carry said disc, the protrusions of said spindle table and said damper at said second position being separated by a distance less than a thickness of said disc; and
    means for further moving said clamper from said second position to a third position engaging said spindle table.

* * * * *